US008498660B2

(12) United States Patent
Lawler et al.

(10) Patent No.: US 8,498,660 B2
(45) Date of Patent: Jul. 30, 2013

(54) ENHANCED GROUP CALLING FEATURES FOR CONNECTED PORTFOLIO SERVICES IN A WIRELESS COMMUNICATIONS NETWORK

(75) Inventors: Bruce D. Lawler, Kirkwood, CA (US); Krishnakant M. Patel, Richardson, TX (US); Ravi Ayyasamy, Richardson, TX (US); Harisha M. Negalaguli, Plano, TX (US); Basem A. Ardah, Plano, TX (US); Gorachand Kundu, Bangalore (IN); Ramu Kandula, Bangalore (IN); Brahmananda R. Vempati, Dallas, TX (US); Ravi Shankar Kumar, Plano, TX (US); Chetan M. Patel, Richardson, TX (US); Shiva K. K. Cheedella, Houston, TX (US)

(73) Assignee: Kodiak Networks, Inc., San Ramon, CA (US)

( * ) Notice: Subject to any disclaimer, the term of this patent is extended or adjusted under 35 U.S.C. 154(b) by 319 days.

(21) Appl. No.: 12/750,175

(22) Filed: Mar. 30, 2010

(65) Prior Publication Data
US 2010/0304724 A1 Dec. 2, 2010

Related U.S. Application Data

(60) Provisional application No. 61/164,754, filed on Mar. 30, 2009, provisional application No. 61/172,129, filed on Apr. 23, 2009.

(51) Int. Cl.
*H04M 7/00* (2006.01)
(52) U.S. Cl.
USPC ........ 455/519; 455/414.1; 455/416; 455/461; 455/518; 455/551; 379/205.01

(58) Field of Classification Search
USPC .............. 455/461, 445, 551, 518, 519, 414.1, 455/416; 379/202.01, 205.01, 158; 709/204
See application file for complete search history.

(56) References Cited

U.S. PATENT DOCUMENTS

| 3,912,874 A | 10/1975 | Botterell et al. |
| 4,796,293 A | 1/1989 | Blinken et al. |

(Continued)

FOREIGN PATENT DOCUMENTS

| GB | 2338150 | 12/1999 |
| JP | 2003-92776 | 3/2003 |

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

(Continued)

*Primary Examiner* — Allahyar Kasraian
(74) *Attorney, Agent, or Firm* — Gates & Cooper LLP

(57) ABSTRACT

Enhanced Group Calling Features for Connected Portfolio Services in wireless communications networks, such as a mobile or cellular phone communications networks. The Connected Portfolio Services include Mobile Conferencing (Scheduled/Instant/Reservationless Conference), Family Connect, Buddy Connect, and Quick Reach, while the Enhanced Group Calling Features include Voicemail Diversion (the recognition of a diversion to voicemail and dropping the leg), Reverse Quick Reach (where a terminating subscriber defines how a call dialed to his/her mobile number should be handled and directed), and Single Number Group Calling (an optimal design implementation of single number based group calling).

10 Claims, 18 Drawing Sheets

US 8,498,660 B2

Page 2

U.S. PATENT DOCUMENTS

| | | | |
|---|---|---|---|
| 5,353,328 | A | 10/1994 | Jokimies |
| 5,442,809 | A | 8/1995 | Diaz et al. |
| 5,546,449 | A | 8/1996 | Hogan et al. |
| 5,711,011 | A | 1/1998 | Urs et al. |
| 5,752,196 | A * | 5/1998 | Ahvenainen et al. ......... 455/518 |
| 5,987,318 | A | 11/1999 | Alperovich et al. |
| 5,987,331 | A | 11/1999 | Grube et al. |
| 6,011,976 | A | 1/2000 | Michaels et al. |
| 6,021,326 | A | 2/2000 | Nguyen |
| 6,138,011 | A | 10/2000 | Sanders, III et al. |
| 6,141,556 | A | 10/2000 | Dougherty et al. |
| 6,192,119 | B1 | 2/2001 | Wilson |
| 6,304,558 | B1 | 10/2001 | Mysore |
| 6,397,054 | B1 | 5/2002 | Hoirup et al. |
| 6,405,030 | B1 | 6/2002 | Suprunov |
| 6,411,815 | B1 | 6/2002 | Balasuriya |
| 6,473,501 | B1 * | 10/2002 | Paulsrud ....................... 379/157 |
| 6,477,366 | B1 | 11/2002 | Valentine et al. |
| 6,477,387 | B1 | 11/2002 | Jackson et al. |
| 6,549,773 | B1 | 4/2003 | Linden et al. |
| 6,577,874 | B1 | 6/2003 | Dailey |
| 6,606,305 | B1 | 8/2003 | Boyle et al. |
| 6,628,937 | B1 | 9/2003 | Salin |
| 6,661,878 | B1 | 12/2003 | Mirashrafi et al. |
| 6,725,053 | B2 | 4/2004 | Rosen et al. |
| 6,751,468 | B1 | 6/2004 | Heubel et al. |
| 6,801,762 | B1 | 10/2004 | Huilgol |
| 6,856,676 | B1 | 2/2005 | Pirot et al. |
| 6,865,398 | B2 | 3/2005 | Mangal et al. |
| 6,892,074 | B2 | 5/2005 | Tarkiainen et al. |
| 6,895,254 | B2 | 5/2005 | Dorenbosch |
| 6,898,436 | B2 | 5/2005 | Crockett et al. |
| 6,996,414 | B2 | 2/2006 | Vishwanathan et al. |
| 7,026,926 | B1 | 4/2006 | Walker, III |
| 7,043,266 | B2 | 5/2006 | Chaturvedi et al. |
| 7,082,316 | B2 * | 7/2006 | Eiden et al. .................... 455/519 |
| 7,085,364 | B1 | 8/2006 | Ahmed et al. |
| 7,099,291 | B2 | 8/2006 | Harris et al. |
| 7,123,905 | B1 | 10/2006 | Allaway et al. |
| 7,170,863 | B1 | 1/2007 | Denman et al. |
| 7,231,225 | B2 | 6/2007 | Rao et al. |
| 7,236,580 | B1 | 6/2007 | Sarkar et al. |
| 7,330,540 | B2 * | 2/2008 | Darby et al. ............. 379/202.01 |
| 7,366,535 | B2 | 4/2008 | Glass et al. |
| 7,403,775 | B2 | 7/2008 | Patel et al. |
| 7,460,861 | B2 | 12/2008 | Zabawskyj |
| 7,529,557 | B2 | 5/2009 | Farrill |
| 7,689,238 | B2 | 3/2010 | Biswas et al. |
| 7,738,892 | B2 | 6/2010 | Ayyasamy et al. |
| 7,738,896 | B2 | 6/2010 | Patel et al. |
| 7,764,950 | B2 | 7/2010 | Patel et al. |
| 7,787,896 | B2 | 8/2010 | Kundu et al. |
| 7,797,010 | B1 | 9/2010 | Manroa et al. |
| 7,813,722 | B2 | 10/2010 | Patel et al. |
| 7,853,279 | B2 | 12/2010 | Patel et al. |
| 8,036,692 | B2 | 10/2011 | Ayyasamy et al. |
| 2001/0005372 | A1 | 6/2001 | Cave et al. |
| 2002/0009990 | A1 | 1/2002 | Kleier et al. |
| 2002/0024943 | A1 | 2/2002 | Karaul et al. |
| 2002/0077136 | A1 | 6/2002 | Maggenti et al. |
| 2002/0086659 | A1 | 7/2002 | Lauper |
| 2002/0086676 | A1 * | 7/2002 | Hendrey et al. ............... 455/445 |
| 2002/0102989 | A1 | 8/2002 | Calvert et al. |
| 2002/0187750 | A1 | 12/2002 | Majumdar |
| 2002/0196781 | A1 | 12/2002 | Salovuori |
| 2003/0009463 | A1 | 1/2003 | Gallant |
| 2003/0016632 | A1 | 1/2003 | Refai et al. |
| 2003/0017836 | A1 | 1/2003 | Vishwanathan et al. |
| 2003/0078064 | A1 | 4/2003 | Chan |
| 2003/0148779 | A1 | 8/2003 | Aravamudan et al. |
| 2003/0153343 | A1 | 8/2003 | Crockett et al. |
| 2003/0190888 | A1 | 10/2003 | Mangal et al. |
| 2004/0032843 | A1 | 2/2004 | Schaefer et al. |
| 2004/0057449 | A1 | 3/2004 | Black |
| 2004/0067751 | A1 | 4/2004 | Vandermeijden et al. |
| 2004/0095954 | A1 | 5/2004 | Varney et al. |
| 2004/0121760 | A1 | 6/2004 | Wetman et al. |
| 2004/0127233 | A1 | 7/2004 | Harris et al. |
| 2004/0152441 | A1 | 8/2004 | Wong |
| 2004/0179531 | A1 | 9/2004 | Bi et al. |
| 2004/0196826 | A1 | 10/2004 | Bao et al. |
| 2004/0203793 | A1 | 10/2004 | Dorenbosch |
| 2004/0219941 | A1 * | 11/2004 | Haaramo et al. ............... 455/519 |
| 2004/0224710 | A1 | 11/2004 | Koskelainen et al. |
| 2004/0228292 | A1 | 11/2004 | Edwards |
| 2004/0259580 | A1 | 12/2004 | Florkey et al. |
| 2005/0047362 | A1 | 3/2005 | Harris et al. |
| 2005/0101308 | A1 | 5/2005 | Lee |
| 2005/0111430 | A1 | 5/2005 | Spear et al. |
| 2005/0143135 | A1 | 6/2005 | Brems et al. |
| 2005/0164737 | A1 | 7/2005 | Brown |
| 2005/0189337 | A1 | 9/2005 | Baune |
| 2005/0192041 | A1 | 9/2005 | Oxley et al. |
| 2005/0202807 | A1 | 9/2005 | Ayyasamy et al. |
| 2005/0221819 | A1 | 10/2005 | Patel et al. |
| 2005/0232241 | A1 | 10/2005 | Wu et al. |
| 2005/0239485 | A1 | 10/2005 | Kundu et al. |
| 2005/0254464 | A1 | 11/2005 | Patel et al. |
| 2005/0261016 | A1 | 11/2005 | Patel et al. |
| 2006/0003740 | A1 | 1/2006 | Munje |
| 2006/0003751 | A1 | 1/2006 | Vo |
| 2006/0019654 | A1 | 1/2006 | Farrill |
| 2006/0029189 | A1 | 2/2006 | Patel et al. |
| 2006/0030347 | A1 | 2/2006 | Biswas |
| 2006/0056361 | A1 | 3/2006 | Jiang et al. |
| 2006/0067499 | A1 | 3/2006 | Oliveira et al. |
| 2006/0078064 | A1 | 4/2006 | Schmidt et al. |
| 2006/0094455 | A1 | 5/2006 | Hannu et al. |
| 2006/0116150 | A1 | 6/2006 | Bhutiani |
| 2006/0128411 | A1 | 6/2006 | Turcanu |
| 2006/0189337 | A1 | 8/2006 | Farrill et al. |
| 2006/0198334 | A1 | 9/2006 | Civanlar et al. |
| 2006/0229090 | A1 | 10/2006 | LaDue |
| 2006/0234687 | A1 | 10/2006 | Patel et al. |
| 2007/0037562 | A1 * | 2/2007 | Smith-Kerker et al. ...... 455/418 |
| 2007/0037597 | A1 | 2/2007 | Biswas et al. |
| 2007/0037598 | A1 | 2/2007 | Ayyasamy et al. |
| 2007/0049314 | A1 | 3/2007 | Balachandran et al. |
| 2007/0070976 | A1 | 3/2007 | Mussman et al. |
| 2007/0133757 | A1 | 6/2007 | Girouard et al. |
| 2007/0154005 | A1 | 7/2007 | Daigle |
| 2007/0190984 | A1 | 8/2007 | Ayyasamy et al. |
| 2007/0197234 | A1 | 8/2007 | Gill et al. |
| 2007/0217591 | A1 | 9/2007 | Yasuma |
| 2007/0218885 | A1 | 9/2007 | Pfleging et al. |
| 2007/0253347 | A1 | 11/2007 | Patel et al. |
| 2008/0064364 | A1 | 3/2008 | Patel et al. |
| 2008/1476671 | | 6/2008 | Simon et al |
| 2009/0092116 | A1 | 4/2009 | Jiang et al. |
| 2009/0119678 | A1 | 5/2009 | Shih et al. |
| 2009/0149167 | A1 | 6/2009 | Patel et al. |
| 2009/0209235 | A1 | 8/2009 | Lawler et al. |
| 2009/0325540 | A1 | 12/2009 | Yach et al. |
| 2010/0035593 | A1 | 2/2010 | Fanco et al. |
| 2010/0142414 | A1 | 6/2010 | Patel et al. |
| 2010/0234018 | A1 | 9/2010 | Lawler et al. |

FOREIGN PATENT DOCUMENTS

| | | |
|---|---|---|
| WO | 00/69189 | 11/2000 |
| WO | 00/79825 | 12/2000 |
| WO | 01/67674 | 9/2001 |
| WO | 02/101981 | 12/2002 |
| WO | 03/101007 | 12/2003 |
| WO | 2005/009006 | 1/2005 |
| WO | 2005/112494 | 11/2005 |
| WO | 2005/115032 | 12/2005 |
| WO | 2005/117474 | 12/2005 |
| WO | 2006/105287 | 10/2006 |
| WO | 2010/117815 | 10/2010 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive —Skype, May 22, 2004, pp. 1-2. XP002345780 http://web.archive.org/web/20040522201727 http://www.skype.com.

Trachwell: "TrackWell Software and Tetra Iceland deliver value added services to Tetra users", Trackwell.com, Oct. 2002, pp. 1-1. XP002345781 http://www.trackwell.com/news/news_twandtetra.htm.

International Search Report mailed Jul. 21, 2010, International application No. PCT/US2010/029274, International filing date Mar. 30, 2010.

\* cited by examiner

ENHANCED GROUP CALLING FEATURES FOR CONNECTED PORTFOLIO SERVICES IN A WIRELESS COMMUNICATIONS NETWORK

CROSS REFERENCE TO RELATED APPLICATIONS

This application claims the benefit under 35 U.S.C. Section 119(e) of the following co-pending and commonly-assigned patent application:

U.S. Provisional Application Ser. No. 61/164,754, filed Mar. 30, 2009, by Bruce D. Lawler, Krishnakant M. Patel, Ravi Ayyasamy, Harisha Mahabaleshwara Negalaguli, Basem A. Ardah, Gorachand Kundu, Ramu Kandula, and Brahmananda R. Vempati, entitled "ENHANCED GROUP CALLING FEATURES," and U.S. Provisional Application Ser. No. 61/172,129, filed Apr. 23, 2009, by Krishnakant M. Patel, Ravi Ayyasamy, Harisha Mahabaleshwara Negalaguli, Ravi Shankar Kumar, and Chetan Patel, entitled "IP CONNECTIVITY FOR CONNECTED PORTFOLIO APPLICATIONS,"

which applications are incorporated by reference herein.

This application is related to the following co-pending and commonly-assigned patent applications:

U.S. application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981, 60/383,179 and 60/407,168;

U.S. application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. patent application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. application Ser. No. 10/515,556 and P.C.T. International Application Serial Number PCT/US04/23038;

U.S. application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. application Ser. No. 10/515,556 and P.C.T. International Application Serial Number PCT/US04/23038;

U.S. application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. application Ser. No. 10/515,556, P.C.T. International Application Serial Number PCT/US04/23038, U.S. application Ser. No. 11/126,587, and U.S. application Ser. No. 11/129,268;

U.S. application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. application Ser. No. 10/515,556, P.C.T. International Application Serial Number PCT/US04/23038, U.S. application Ser. No. 11/126,587, and U.S. application Ser. No. 11/134,883;

U.S. application Ser. No. 11/158,527, filed Jun. 22, 2005, by F. Craig Farrill, entitled "PRESS-TO-CONNECT FOR WIRELESS COMMUNICATIONS SYSTEMS," which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. application Ser. No. 10/515,556 and P.C.T. International Application Serial Number PCT/US4/23038;

U.S. application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464;

U.S. application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/654,271; P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424;

U.S. application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NET- WORKS," which application claims the benefit under 35 U.S.C. Section 119(e) of U.S. Provisional Application Ser. No. 60/705,115;

U.S. application Ser. No. 11/463,186, filed Aug. 8, 2006, by Ravi Ayyasamy and Krishnakant M. Patel, entitled "ADVANCED VOICE SERVICES CLIENT FOR BREW PLATFORM," which application claims the benefit under 35 U.S.C. Section 119(e) of U.S. Provisional Application Ser. No. 60/706,265;

U.S. application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250;

U.S. application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," which application claims the benefit under 35 U.S.C. Section 119(e) of U.S. Provisional Application Ser. No. 60/795,090;

U.S. application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521;

U.S. application Ser. No. 12/259,102, filed Oct. 27, 2008, by Krishnakant M. Patel, Bruce Lawler, Gorachand Kundu, Ravi Ayyasamy, Ravi Shankar Kumar, Harisha Mahabaleshwara Negalaguli, Basem Ahmad Ardah, Prathap Chandana, Shan-Jen Chiou, Arun Velayudhan, and Ramu Kandula, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. No. 60/982,650 and U.S. Provisional Application Ser. No. 61/023,042;

U.S. application Ser. No. 12/359,861, filed Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," which application claims the benefit under 35 U.S.C. Section 119(e) of U.S. Provisional Application Ser. No. 61/023,332;

U.S. application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," which application claims the benefit under 35 U.S.C. Section 119(e) of U.S. Provisional Application Ser. No. 61/106,689;

all of which applications are incorporated by reference herein.

BACKGROUND OF THE INVENTION

1. Field of the Invention

This invention relates in general to wireless communications systems, and more specifically, to enhanced group calling features for connected portfolio services in a wireless communications network.

2. Description of Related Art

Advanced Voice Services (AVS), also known as Advanced Group Services (AGS), can include a number of different functions, such as Push-to-Conference (P2C) or Instant Conferencing, etc., as described in the co-pending and commonly-assigned patent applications cross-referenced above and incorporated by reference herein. These AVS functions have enormous revenue earnings potential for wireless communications systems, such as mobile phone networks.

Currently, there are three major approaches employed in providing AVS and AGS in wireless communications systems. One approach requires the installation of a dedicated private network, parallel to the wireless communications system, to support the group-based voice services. However, a dedicated private network is costly to install and maintain.

Another approach is based on Voice over IP (VoIP) technologies. While this approach promises compliance with newer and emerging standards, such as GPRS (General Packet Radio Service), UMTS (Universal Mobile Telecommunications System), etc., it does not provide a solution for carriers employing wireless communications systems based on existing standards, such as GSM, CDMA, etc. However, even for the newer standards, solutions based on VoIP have serious drawbacks, including slower call setup, significant overhead, increased susceptibility to packet losses, low bit rate voice coders, and significant modifications to the mobile handset.

Still another approach is the innovative approach described in the co-pending and commonly-assigned patent applications cross-referenced above and incorporated by reference herein. In this approach, advanced voice services are provided by a real-time exchange (RTX), also known as a dispatch gateway (DG), that interfaces to the wireless communications system to provide the advanced voice services therein, wherein both the real-time exchange and mobiles that use the advanced voice services communicate with each other using call setup and in-band signaling within the wireless communications system.

However, notwithstanding the innovations described in the co-pending and commonly-assigned patent applications cross-referenced above, there is a need in the art for improvements to the AVS, as well as additional AVS, that comply with existing and emerging wireless standards and provide superior user experiences. The present invention aims to satisfy this need by providing additional services, also known as Connected Portfolio Services, and improvements to those additional services, also known as Enhanced Group Calling Features for Connected Portfolio Services, in wireless communications systems.

SUMMARY OF THE INVENTION

To overcome the limitations in the prior art described above, and to overcome other limitations that will become apparent upon reading and understanding the present specification, the present invention discloses Enhanced Group Calling Features for Connected Portfolio Services in wireless communications networks, such as a mobile or cellular phone communications networks. The Connected Portfolio Services include Mobile Conferencing (Scheduled/Instant/Reservationless Conference), Family Connect, Buddy Connect, and Quick Reach, while the Enhanced Group Calling Features include Voicemail Diversion, Reverse Quick Reach, and Single Number Group Calling. These and other aspects of the present invention are described in more detail below.

BRIEF DESCRIPTION OF THE DRAWINGS

Referring now to the drawings in which like reference numbers represent corresponding parts throughout.

DETAILED DESCRIPTION OF THE INVENTION

Figure 1:
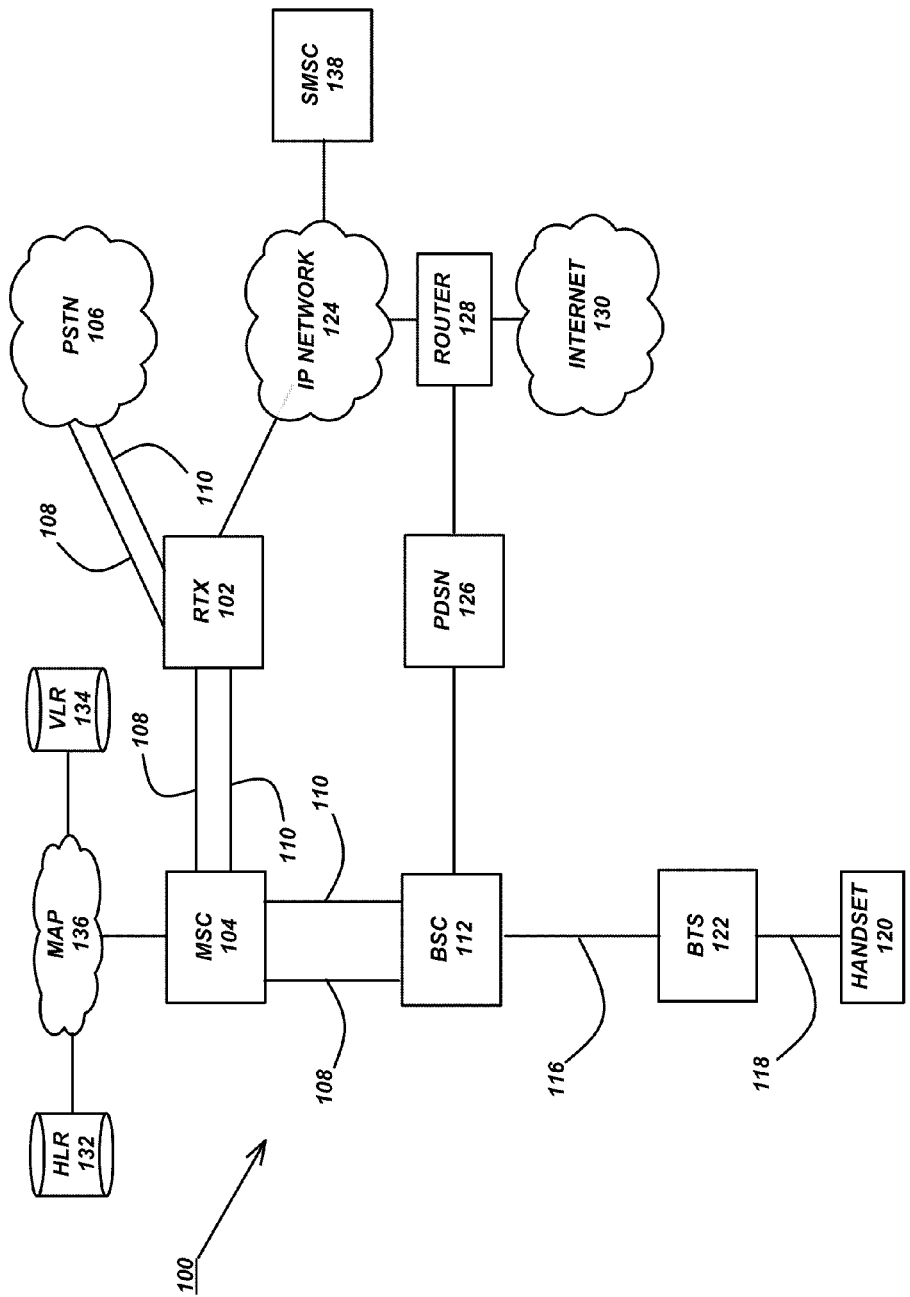
FIG. 1 is a block diagram that illustrates an exemplary embodiment of a wireless communications network, according to a preferred embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview 1.1 Enhanced Group Calling Features for Connected Portfolio Services in a Wireless Communications Network The present invention discloses Connected Portfolio Services, which are also described in co-pending and commonly assigned U.S. application Ser. No. 12/259,102, filed Oct. 27, 2008, by Krishnakant M. Patel, Bruce Lawler, Gorachand Kundu, Ravi Ayyasamy, Ravi Shankar Kumar, Harisha Mahabaleshwara Negalaguli, Basem Ahmad Ardah, Prathap Chandana, Shan-Jen Chiou, Arun Velayudhan, and Ramu Kandula, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. No. 60/982,650 and U.S. Provisional Application Ser. No. 61/023,042, which applications are incorporated by reference herein. The present invention also discloses improvement to the Connected Portfolio Services, known as Enhanced Group Calling Features for Connected Portfolio Services in wireless communications systems, which are described in more detail herein.

More specifically, the Connected Portfolio Services include Mobile Conferencing (Scheduled/Instant/Reservationless Conference), Family Connect, Buddy Connect, and Quick Reach:

1. Scheduled Conference: This service allows a mobile handset user to schedule a conference with a group of other users at a predetermined date and time. There are two modes of operation: Dial-Out and Dial-In:

a) Dial-Out: In this option, a Real-Time Exchange (RTX) will dial out the call to participants in a scheduled conference, and then bridge the conference call between the participants.

b) Dial-In: In this option, participants in a scheduled conference dial in to a conference bridge number.

A number of unique technologies are provided to facilitate the Scheduled Conference service with many user friendly features, such as conference call notification, one-touch dial to join a conference call, etc.

2. Reservationless Conference: This service allows a user to set up a conference bridge and communicate the conference bridge access number and password to participants of a conference call. This solution is "clientless" in that the originator does not need a handset client application to invoke this service.

3. Instant Conferencing: This service allows users to create and manage groups using multiple different means, such as via the Web, via Short Message Service (SMS), via Wireless Access Protocol (WAP), via an operator, etc. Once a group is created, the originator receives a single dial out number; upon dialing this number, the originator is connected to the group.

4. Family Connect: The Family Connect service allows user to make an instant conference call to all the family members. It can utilize the operator's existing family plan database instead of creating its own database.

5. Buddy Connect: The Buddy Connect service allows a user to create a buddy group and make an instant conference by any buddy member in the buddy group.

6. Quick Reach: The Quick Reach service is a call originating service that allows a user to create a list of phone numbers in order to reach a particular person. When the user originates this type of call, all the phones for that particular person are called and rang until one of the phones answers the call, and then the rest of call attempts are dropped.

The Enhanced Group Calling Features include Voicemail Diversion, Reverse Quick Reach, and Single Number Group Calling:

A. Voicemail Diversion: The recognition of a diversion to voicemail and dropping the leg.

B. Reverse Quick Reach: The terminating subscriber defines how a call dialed to his/her mobile number should be handled and directed. In addition, the RTX is removed from the media path following a Quick Reach termination.

C. Single Number Group Calling: An optimal design implementation of single number based group calling in a cellular network including a geo-redundant RTX deployment.

2 System Description 2.1 Overview

The following illustration explains the network reference architecture used to provide the Enhanced Group Calling Features for the Connected Portfolio Services described herein. These Enhanced Group Calling Features for the Connected Portfolio Services are provided without any changes to the existing network infrastructure, but merely the addition of a service control point, known as a Real-Time Exchange (RTX), connected to the network and a client application embedded in the handset (although a clientless version of the handset may be provided as well).

2.2 Network Architecture

FIG. 1 is a block diagram that illustrates an exemplary embodiment of a wireless communications network according to a preferred embodiment of the present invention.

Within the network 100, an RTX 102, also known as a Dispatch Gateway (DG), communicates with a MSC (Mobile Switching Center) 104 and PSTN (Public Switched Telephone Network) 106 using SS7—ISUP/WIN/CAMEL (Signaling System 7—Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of an AVS call. The use of TFO ensures high voice quality (as voice vocoder conversion is avoided) between mobile-to-mobile calls.

When a subscriber originates an AVS call, the MSC 104 routes the call to the RTX 102. The MSC 104 also requests the BSC 112 via 116 to establish a radio traffic path 118 with a mobile station (MS) 120 (also known as a handset or mobile unit) via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the group call request to the RTX 102), the RTX 102 identifies the terminating group users and their numbers, which may comprise an MS-ISDN (Mobile Station-Integrated Services Digital Network) number, an IMSI (International Mobile Subscriber Identity) number, or an MDN (Mobile Directory Number).

The RTX 102 sends an ISUP call origination request for each terminating handset 120. It may send requests directly to the MSC 104, PSTN 106 or IP network 124 via a PDSN (Public Data Switched Network) 126, Router 128, and/or Internet/Intranet 130, depending on the routing table configuration for terminating numbers. Once the bearer path 110 is established, the RTX 102 begins a negotiation with the far end (in this case, the terminating BSC 112) for each terminating leg to a handset 120.

Once bearer paths 110 are established for originating and terminating legs for an AVS call, the RTX 102 switches (or duplicates) voice or data from the originating handset 120 to all terminating handsets 120.

The RTX 102 may also use an IP network 124 or the Internet/Intranet 130. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration and presence application. Since the MSC 104 will not direct a registration request from a handset 120 to the RTX 102 (because it would require changes in the MSC 104), the latter does not have any information of the registered handset 120. To circumvent this issue, a registration and presence application runs over an IP stack in the handset 120. After the handset 120 registers for a data interface (i.e., obtaining an IP address) with the PDSN 126 (or Serving GSM Service Nodes (SGSN) in the case of GSM networks), the registration and presence application in the handset 120 registers with the RTX 102 using its IP address. The RTX 102 also uses this IP interface to update the presence information of other group members to a handset 120.

An alternative embodiment may use the SMS (Short Message Service) transport to carry presence messages over a data channel. The RTX 102 interacts with the handset 120 using predefined presence application related messages that are transported as SMS messages. The same messages can be transported via the PDSN 126 interface, if group users have data service.

During roaming, a Home Location Register (HLR) 132 and Visitor Location Register (VLR) 134 can be accessed via the MSC 104 and a MAP link 136. The HLR 132 and VLR 134 are used to track the mobile handsets 120 within home or foreign networks, while the RTX 102 is used to track the presence of members of a group within the home or foreign networks and updates the mobile handsets 120 for those members with the network availability of other members of the group.

A Short Message Service Center (SMSC) 138 is accessible via the IP network 124 (or other element) for the storage of text messages (SMS messages). When an SMS message is sent to a handset 120, the message is first stored in the SMSC 138 until the recipient handset 120 is available (e.g., a store-and-forward option).

2.3 Real Time Exchange

Figure 2:
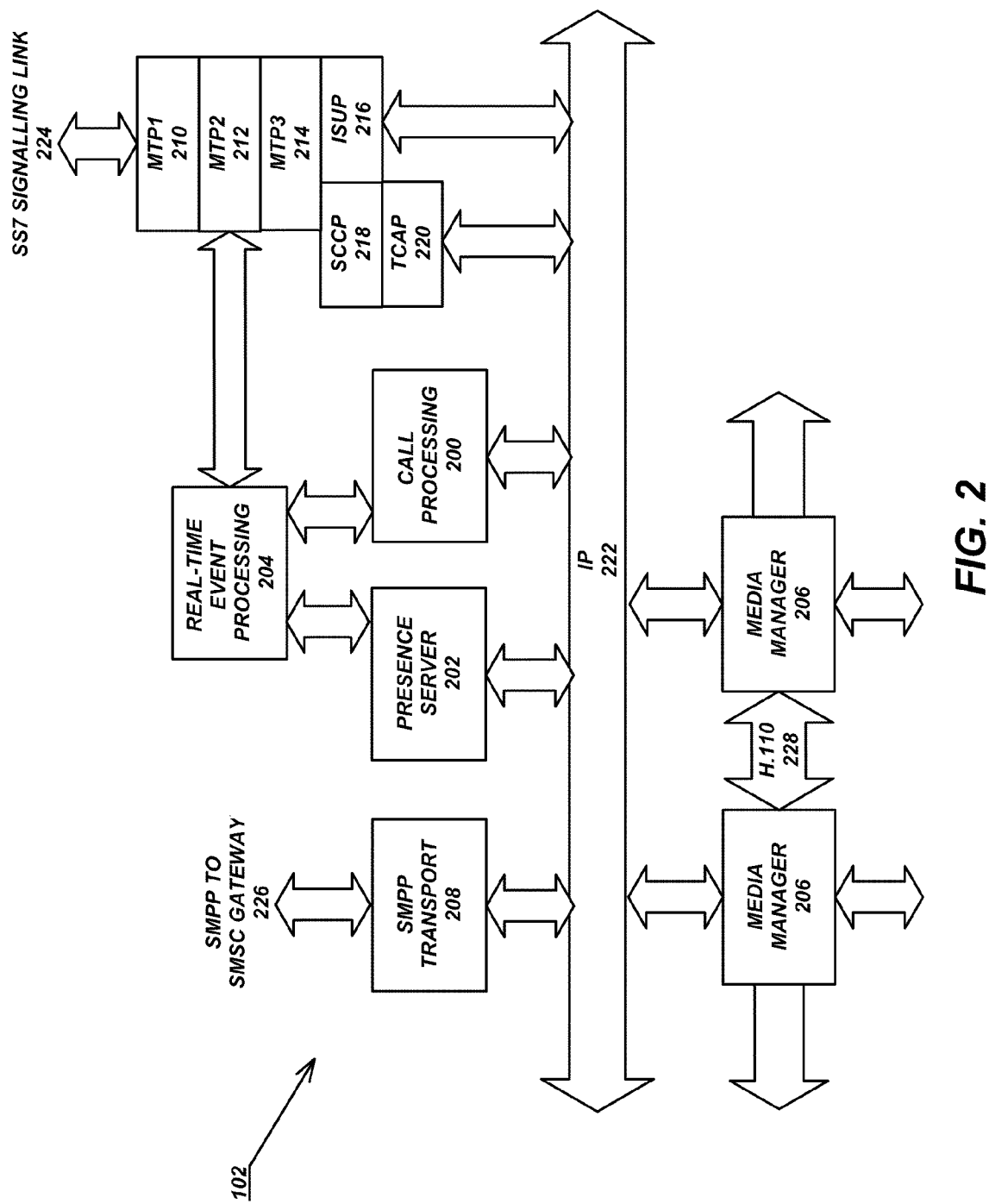
FIG. 2 illustrates a proposed architecture for the RTX, according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228 (or some other protocol, such TCP/IP).

The operation of these various components are described in more detail below, as well as in the co-pending and commonly-assigned patent applications cross-referenced above and incorporated by reference herein.

The originating handset 120 signals the RTX 102 via the wireless network 100, e.g., by transmitting one or more messages to the RTX 102. The Media Manager systems 206 receive the messages and pass the messages to the Call Processing system 200. The Call Processing (CP) system 200 determines whether the originating handset 120 has subscribed to the AVS before originating the AVS call. Upon confirmation, the Call Processing system 200 initiates a new AVS call. The Call Processing system 200 interacts with the Presence Server 202 and Real-Time Event Processing system 204 to cause the wireless network 100 to perform call setup with the terminating handsets 120 for the AVS call, and thereafter to manage the AVS call.

During the AVS call, the Call Processing system 200 interacts with the Media Manager systems 206 to maintain the H.110 channels 227 and assign any additional H.110 channels 228 required for the AVS call, which may span across multiple Media Manager systems 206. During the AVS call, the Media Manager systems 206 of the RTX 102 are used to mix audio streams between the originating handset 120 and the terminating handset 120, and then deliver these mixed audio streams to the originating handset 120 and the terminating handset 120. The H.110 channels 228 are used for passing mixed and unmixed audio streams voice between the Media Manager systems 200 as required.

2.4 Mobile Station Components

Figure 3:
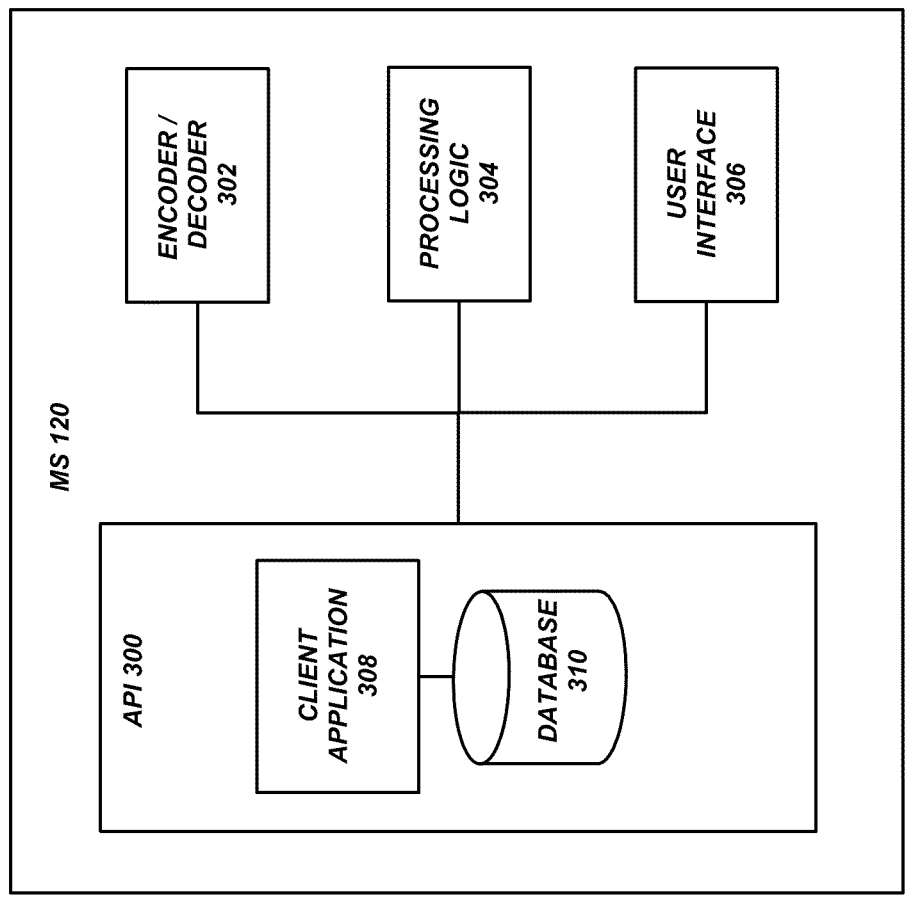
FIG. 3 illustrates the high-level functional components and their interfaces in a handset, according to a preferred embodiment of the present invention.

FIG. 3 illustrates the high-level functional components and their interfaces in the handset 120 according to a preferred embodiment of the present invention. In one embodiment, the software architecture used in the handset 120 is based on an Open OS implementation and is available under multiple operating systems, including JAVA, WINDOWS MOBILE, SYMBIAN and BREW.

Preferably, the software architecture used in the handset 120 provides an application programming interface (API) that supports the logic and data required within the handset 120 for providing cellular service, including the functions necessary for the making an AVS call generally, for providing the Connected Portfolio Services generally and for providing the Enhanced Group Calling Features for the Connected Portfolio Services specifically.

The high-level functional components of the handset 120 include a subscriber identity module (SIM) 300, encoder/decoder 302, processing logic 304 and user interface 306. A client application 308 is provided on the SIM 300 that supports AVS functionality for the handset 120. In addition, the SIM 300 stores a database 310, which includes an address book, AVS contacts and/or group information.

At power-on, the handset 120 loads the client application 308 necessary to support the AVS. This functionality provided includes the "look and feel" of the menu displays on the handset 120, as well as user interaction with the menu displays.

During operation, the encoder/decoder 302 decodes and encodes messages, and populates specific data structures in the handset 120. The encoder/decoder 302 checks the validity of the incoming messages by verifying mandatory parameters for each of the incoming messages. A message will not be processed further if the encoder/decoder 302 fails to decode the message.

The processing logic 304 handles all the AVS related functionalities. The processing logic 304 implementation is device-specific and vendor-specific, and it interacts with the other components, including the encoder/decoder 302, user interface 306, client application 308 and database 310.

The processing logic 304 provides an auto-answer mechanism for AVS calls. Specifically, when a call is received, the processing logic 304 automatically answers the call. The processing logic 304 makes use of call notification for incoming call detection and, based on various parameters received within the call notification, determines whether the call is an AVS call. If the call is an AVS call, then the processing logic 304 uses "AT" commands to answer the AVS call and turn on the speaker of the handset 120. (All of this takes place within a certain time period.) On the other hand, if the call is not an AVS call, then normal call processing is performed by the handset 120.

The processing logic 304 also provides "floor control" using DTMF tone control. For example, in push-to-talk (P2T) calls, which are half-duplex, a determination of who may talk is based on who has the "floor." Using the processing logic 304 provided in the handset 120, appropriate DTMF tones are sent to the RTX 102 in accordance with specific key sequences (i.e., pressing and/or releasing a P2T key) that indicate whether the "floor" has been requested and/or released by the user.

In addition, the processing logic 304 provides SMS destination control based on the type of subscriber. At the time of subscriber data provisioning, if it is determined that the handset 120 will use AVS based logic, then appropriate logic is invoked in the RTX 102 to send presence messages over SMS to the handset 120. Similarly, the handset 120 is configured at the time of provisioning to receive/accept such SMS and respond to the RTX 102 appropriately.

Finally, the processing logic 304 also enables subscribers to track the presence of fellow members of the group in the network 100 on their handset 120, and provides a mechanism and API to carry-out contacts and group management operations on the handset 120, such as add member, delete member, etc.

Since most of the presence information is stored in the database 310, the database 310 is tightly integrated with the processing logic 304. The database 310 stores groups, contacts, presence and availability related information. The database 310 information essentially contains group and member information along with presence information associated with each group and member. Apart from group and member information, the database 310 also stores subscriber information, such as privileges, presence information, etc. The other components of the handset 120 may interact with the database 310 to retrieve/update the group, members and presence information for various operations. The database 310 also has pointers to the native address book on the handset 120, to provide seamless "alias" naming for contacts used with cellular calls, as well as AVS.

The user interface 306 provides a mechanism for the user to view and manage groups, group members, contacts, presence and availability. The user interface 306 also makes it possible to invoke the AVS from the group/contact list screens, as described in more detail below.

2.5 Connected Portfolio Services

The RTX 102 and handset 120 work together to provide the functionality of the Connected Portfolio Services for the wireless communications network 100. The specifics of this functionality are described in more detail in the following sections.

3 Scheduled Conference

The Scheduled Conference service allows a moderator to schedule a conference in advance. Establishing a scheduled conference can be done by connecting to the RTX 102 through the handset 120 or via Internet access. The originator can specify how to set up the type of participant connection (Dial-In or Dial-Out) and whether a moderator (e.g., the originator) is required on the call or not.

Figure 4:
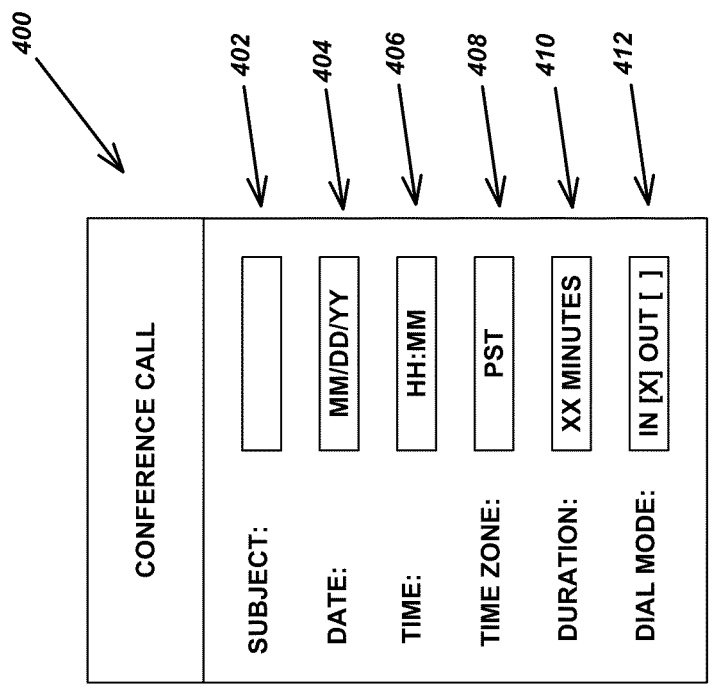
FIG. 4 illustrates the user interface for a conference scheduler as displayed on the handset, according to a preferred embodiment of the present invention.

FIG. 4 illustrates the user interface 400 for the conference scheduler as displayed on the handset 120, according to a preferred embodiment of the present invention. The user can specify a subject 402, date 404, time 406, time zone 408, duration 410, as well as dial mode options 412, including either Dial-In or Dial-Out modes of operation.

The RTX 102 notifies each participant and originator with the conference details using SMS. For Dial-Out conferences, also known as an Instant Conference (IC), the RTX 102 dials each participant at the scheduled time. For Dial-In conferences, also known as a Reservationless Conference (RC), each participant simply presses the Send key on their handset 120 after high-lighting the bridge number within the conference details SMS.

Figure 5:
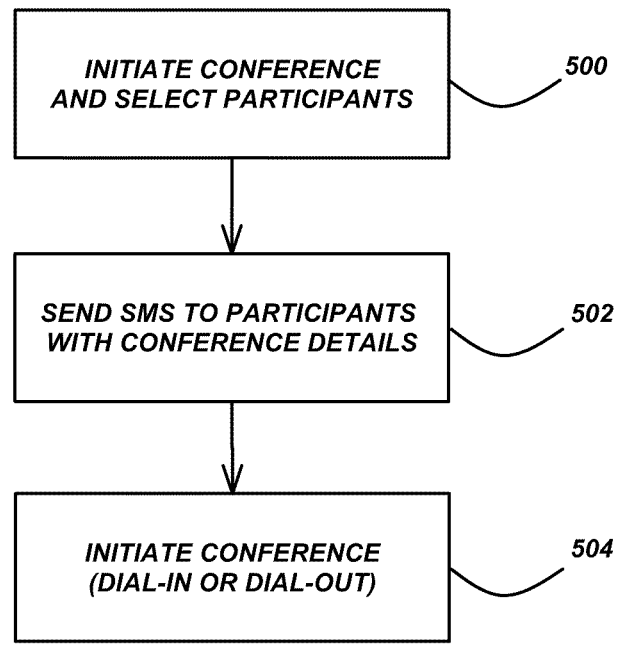
FIG. 5 is a flowchart that illustrates the steps performed in a Scheduled Conference, according to a preferred embodiment of the present invention.

FIG. 5 is a flowchart that illustrates the steps performed in a Scheduled Conference, according to a preferred embodiment of the present invention.

Block 500 represents the originator selecting a "New Conference" option on the handset and providing the conference details via the user interface shown in FIG. 4. The originator then selects the conference participants from the address book, and presses the Send key on the handset to complete the scheduling of the conference, which sends an SMS to the RTX.

Block 502 represents the RTX sending a conference details SMS to the conference participants.

Block 504 represents the initiation of the conference, at the conference start time.

In Dial-In mode, the participant selects the conference details SMS on the handset and then selects the Send key on the handset to dial into the conference. The conference participants may also dial in from a landline using a global number and access code.

In Dial-Out mode, the RTX will dial out to all the participants as well as the originator.

3.1 End User Features

The main features of the Scheduled Conference include the following:
- Dial-In or Dial-Out Conference Type,
- Start Without Me option (Yes/No),
- Continue Without Me option (Yes/No),
- Duration of Conference, and
- My Conferences Tab (view of conferences originated and/or participated in).

3.2 Mid Call Add/Drop

This feature provides the user with the ability to add or drop participants to an active conference call. The user can select some specified number of participants to add to or drop from a conference call. The Mid Call Add/Drop feature can be accessed by the user under an Options menu on the handset.

3.3 Rejoin a Conference Call

This feature allows for the originator or any participants of a conference call to rejoin an active conference call, if they have dropped at any time. The RTX 102 sends an SMS to the originator and all participants of the conference call with the bridge information. The end user can simply press the Send key on the handset 120 while displaying the SMS to rejoin the conference call. To rejoin a clientless conference, the participants can dial a global conference number and enter an access code at any time. (An SMS is not sent to clientless conference participants.)

3.4 Call Flows

The call flows for Scheduled Conference in CDMA and GSM networks can be found in co-pending and commonly assigned U.S. application Ser. No. 12/259,102, filed Oct. 27, 2008, by Krishnakant M. Patel, Bruce Lawler, Gorachand Kundu, Ravi Ayyasamy, Ravi Shankar Kumar, Harisha Mahabaleshwara Negalaguli, Basem Ahmad Ardah, Prathap Chandana, Shan-Jen Chiou, Arun Velayudhan, and Ramu Kandula, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. No. 60/982,650 and U.S. Provisional Application Ser. No. 61/023,042, which applications are incorporated by reference herein.

4 Family Connect Group Call

The Family Connect service is an Instant Conference service that utilizes the existing operator's existing family plan database and terminates calls to all the family members when a nation-wide number is dialed by the user.

The main features of Family Connect are:
- One group per user,
- Existing family plan databases can be used,
- One global nation-wide access number (i.e. a dialable number), and
- Group management via the Internet.

Alternatively, when an operator's network does not provide a family plan database, this service provides a Web interface for the user to create/update/view her/his own family members.

5 Buddy Connect Group Call

The Buddy Connect service is Instant Conference service, wherein the user creates "buddy connect" groups via the Internet.

The main features of Buddy Connect are:
- Multiple groups per user,
- Each group contains up to a specified number of members,
- Each member can be in multiple groups,
- Each group is assigned a unique access number (i.e. a dialable number),
- Group management is performed by the creator via the Internet.

6 Quick Reach

The Quick Reach service allows a user to reach a called party by making call attempts to all possible phone numbers (i.e., Customer Premise Equipment (CPE)) used or owned by the called party. The user creates Quick Reach groups via the Internet.

The main features of Quick Reach are:
- Multiple groups per user,
- Each group contains up to a specified number of contact numbers,
- Each group is assigned a unique access number (i.e. a dialable number),
- Group management is performed by the creator via the Internet.

7 Reservationless Conference/Clientless Conference

A Reservationless Conference, also known as Clientless Conference, provides a "Meet me on my bridge" capability without a client on the handset. Each clientless conference subscriber will have a standing bridge that can be accessed at anytime. The conference owner will create an access code for each conference and provide the access code to the participants. Participants will enter the access code that was created by the conference owner and join the conference once the owner has joined the call.

7.1 Originator User Flows

Figure 6:
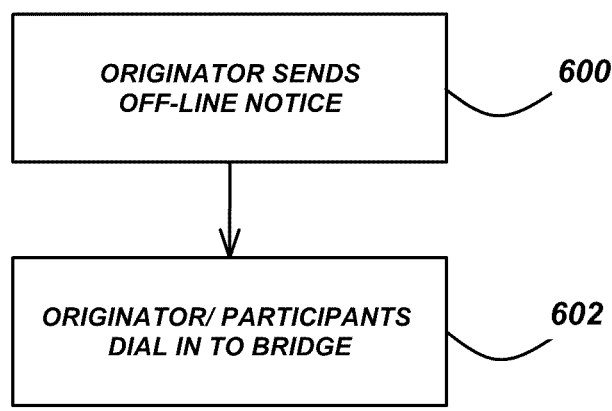
FIG. 6 is a flowchart that illustrates the steps performed in a Reservationless Conference Origination, according to a preferred embodiment of the present invention.

FIG. 6 is a flowchart that illustrates the steps performed in a Reservationless Conference Origination, according to a preferred embodiment of the present invention. Block 600 represents the originator, using a handset with a client application, sending an off-line conference notice, which includes a call-in number allocated by the RTX, a conference ID such as the originator's mobile number, and an access code.

Block 602 represents the initiation of the conference, at the conference start time. The originator and the participants dial the call-in number, and are prompted by the RTX to enter the conference ID and the access code. The conference participants may dial in from a landline as well as a handset. All of the participants can rejoin the conference call at any time using the same steps.

7.2 End User Features

The main features of the Reservationless Conference include the following:

A single conference bridge number to remember,
Mid Call Add using dialed digits,
Mid Call Drop using dialed digits,
A List of Participants sent via SMS to all members in conference,
Support for any Dial-able Number,
Rejoin a conference call, and
Originator creates access code per conference.

7.3 Mid Call Add/Drop

This feature provides the user with the ability to add or drop participants to/from an active Clientless Conference. The originator can enter the full MDN of the participant to add or drop from the keypad of the handset during an active Clientless Conference

8 Enhanced Group Calling Features

As noted above, the Connected Portfolio Services include such services as Mobile Conferencing (i.e., Scheduled/Instant/Reservationless Conferencing), Family Connect, Group Connect, and Quick Reach, all of which use a single number to designate a logical group of numbers.

In the case of Mobile Conferencing, Family Connect and Group Connect, the numbers represented are the conference participant numbers, family or group members' numbers, respectively. In the case of Quick Reach, the numbers represent one particular subscriber's numbers (such as home, office, mobile, etc.)

As noted above, the Enhanced Group Calling features for these Connected Portfolio Services include:

the recognition of a diversion to voicemail and dropping the leg;
the introduction of "Reverse Quick Reach" where the terminating subscriber defines how a call dialed to his/her mobile number should be handled and directed;
the removal of the RTX 102 from the bearer path following a Quick Reach termination; and
an optimal design implementation of single number based group calling in a cellular network including a geo-redundant RTX 102 deployment.

8.1 Dropping a Voicemail Leg in Group Calling Scenarios

In all variants of the Connected Portfolio Services, it is imperative that the RTX 102 initiating the terminating legs of the Connected Portfolio Services recognizes that one or more of the terminating legs of the Connected Portfolio Services has been diverted to voicemail and drops the terminating legs that have been diverted to voicemail from the Connected Portfolio Services. The diversion of call legs to voicemail, and the dropping those call legs from inclusion in a conference bridge, prevents the group communications from being recorded on a voicemail, which entails privacy issues, and also prevents the awkward interjection of voicemail greetings and announcements into the group communications.

The present invention's diversion to voicemail is based on two methods:

the receipt by the RTX 102 of a diversion indicator and diversion number in a ISUP Call Progress Message (CPG) message from the MSC 104, where the diversion number is then compared and matched to a list of voicemail numbers by the RTX 102; and the non-receipt of an indicator confirming participation in the group call (e.g., requiring that the "#" key on the handset 120 be pressed by the terminating user upon answering a group call).

Figure 7:
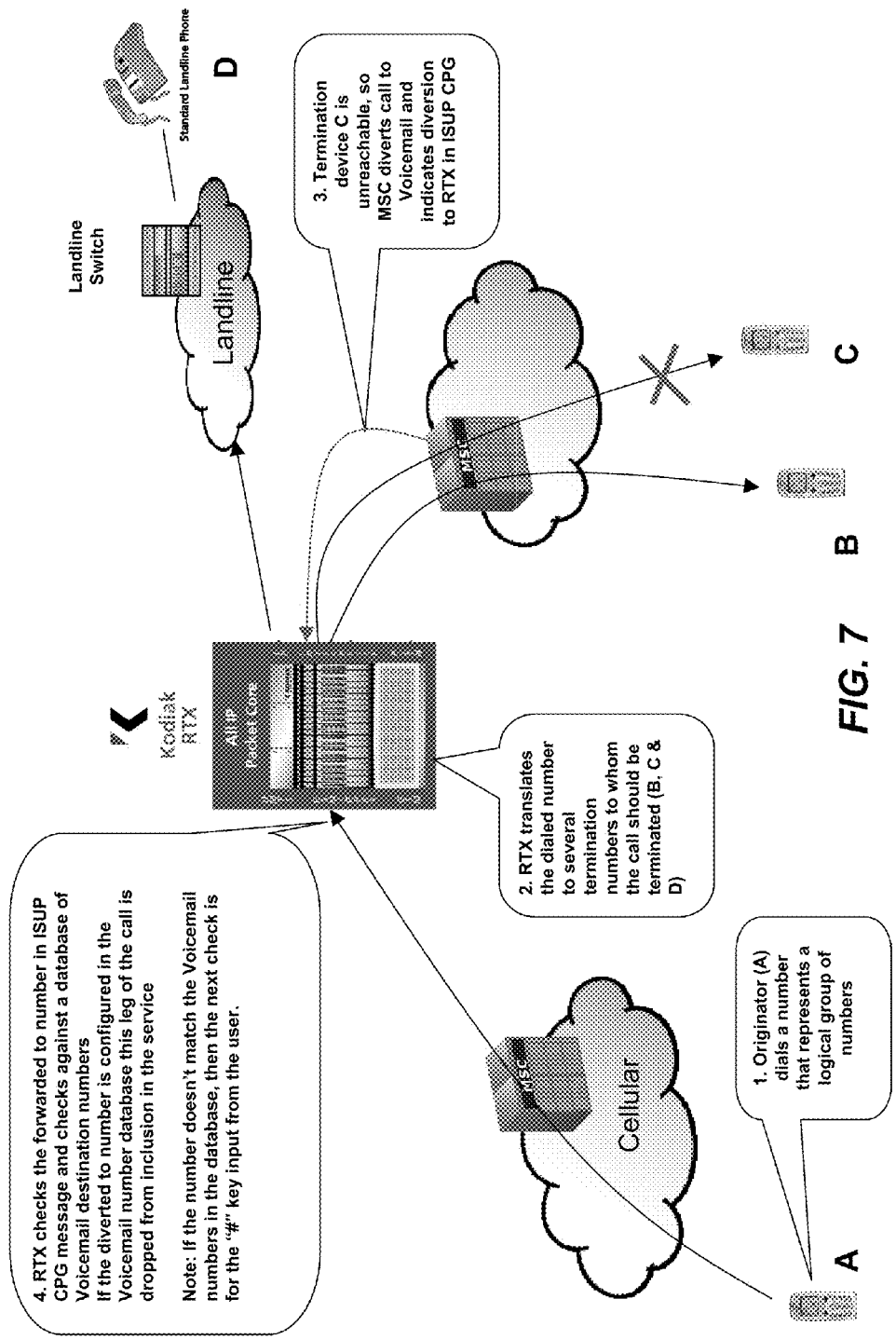
FIG. 7 illustrates a first method for dropping a voicemail leg in a group calling scenario, according to a preferred embodiment of the present invention.

FIG. 7 illustrates a first method for dropping a voicemail leg in a group calling scenario, according to a preferred embodiment of the present invention.

In Step 1, an originator (A) dials a number that represents a logical group of numbers.

In Step 2, the RTX translates the dialed number to several termination numbers to whom the call should be terminated (B, C and D).

In Step 3, the termination device C is unreachable, so the MSC diverts the call to voicemail and indicates the diversion to the RTX in an ISUP CPG message containing a diversion or "forwarded-to" number.

In Step 4, the RTX receives the "forwarded-to" number in the ISUP CPG message and checks the number against a database of voicemail destination numbers. If the diversion number is configured in the voicemail destination number database, then this leg of the call is dropped from inclusion in the service.

Note that, if the diversion number does not match a voicemail destination number in the database, then the next check performed by the RTX is the "#" input from user that applies, as described in the next figure.

Figure 8:
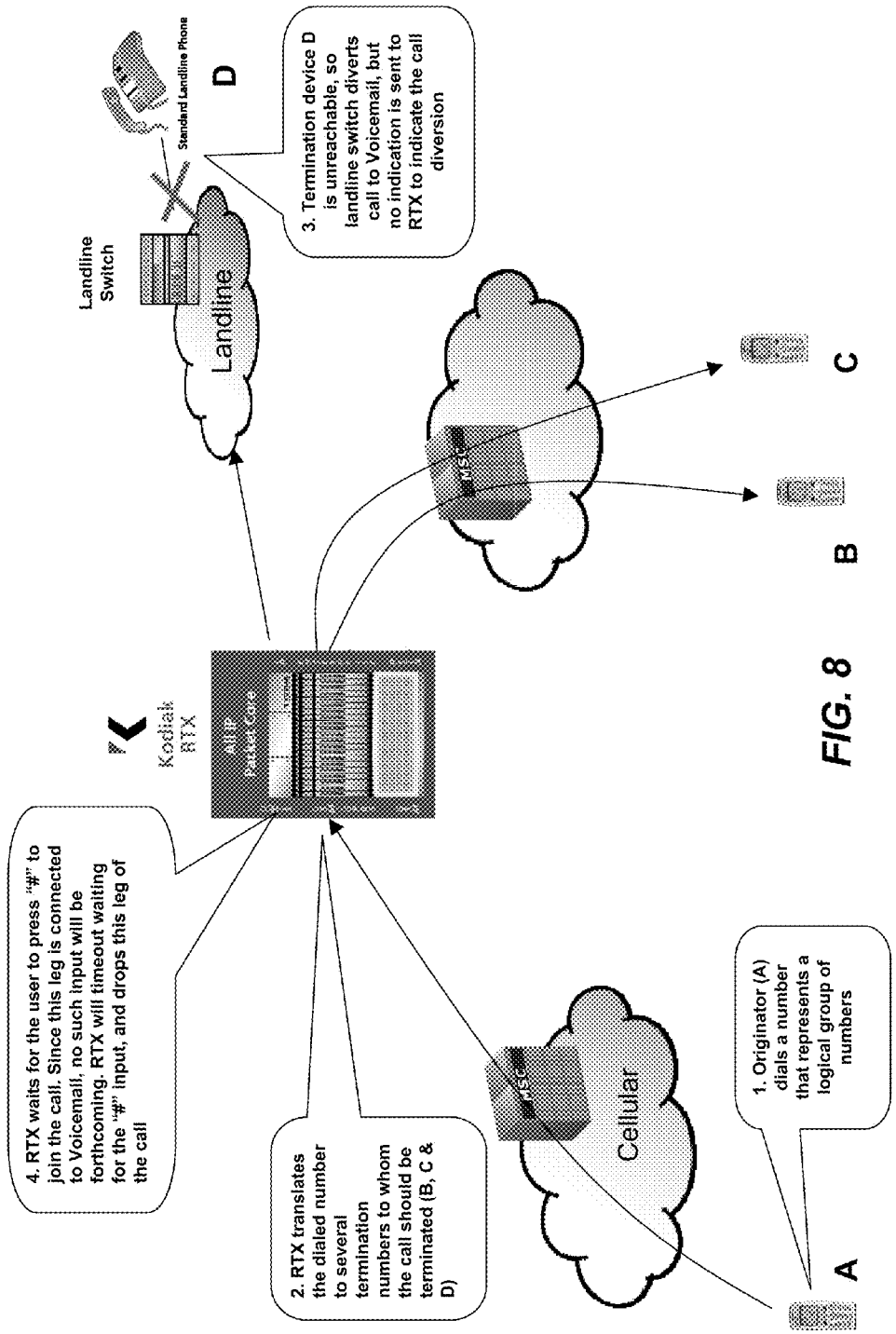
FIG. 8 illustrates a second method for dropping a voicemail leg in a group calling scenario, according to a preferred embodiment of the present invention.

FIG. 8 illustrates a second method for dropping a voicemail leg in a group calling scenario, according to a preferred embodiment of the present invention.

In Step 1, an originator (A) dials a number that represents a logical group of numbers.

In Step 2, the RTX translates the dialed number to several termination numbers to whom the call should be terminated (B, C and D).

In Step 3, the termination device D is unreachable, and a landline switch diverts the call to voicemail, but no indication is sent to the RTX indicate the call diversion.

In Step 4, the RTX waits for the user to press "#" to join the call. Since this leg is connected to a voicemail, no such input will be forthcoming. The RTX will timeout waiting for this input, and drops this leg of the call from inclusion in the service.

8.2 Reverse Quick Reach

As noted above, Quick Reach is a service that allows the originator to ring multiple phone numbers of the same person simultaneously, sequentially or selectively (i.e., an originating user service). Reverse Quick Reach is variation of the above service, albeit a terminating user service that applies termination call handling to the terminator's "published mobile number" during termination and allows simultaneous, sequential or selective ringing of multiple phone numbers.

Specifically, when the terminating user answers one of the phone numbers, the remaining legs of the call are dropped.

The service is accomplished by arming the mobile number for terminating triggers. A Gateway MSC (GMSC) 104 terminating the call, which is an MSC 104 directly connected to the RTX 102, is instructed to connect to the RTX 102 for subscribers that are configured for this service. The RTX 102 then terminates the calls to all the numbers configured for this user. When the user answers at one of the numbers (and presses the "#" key to confirm joining the group call), the RTX 102 drops the remaining (unanswered) legs and connects the user to the originator.

Figure 9:
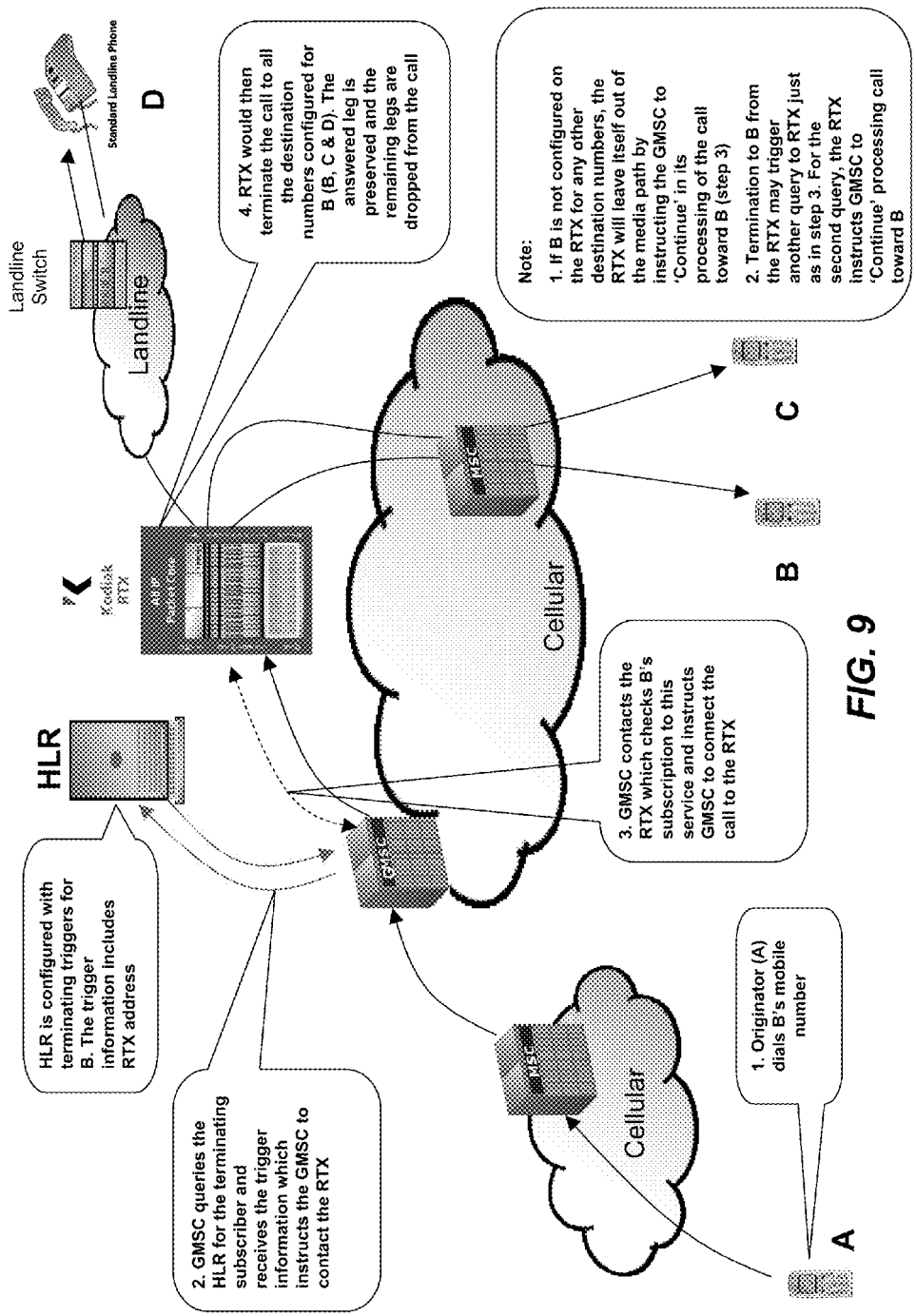
FIG. 9 illustrates a method for performing Reverse Quick Reach, according to a preferred embodiment of the present invention.

FIG. 9 illustrates a method for performing Reverse Quick Reach, according to a preferred embodiment of the present invention.

In Step 1, an originator (A) dials B's mobile number.

In Step 2, the GMSC queries the HLR for the terminating subscriber B and receives the trigger information which instructs the GMSC to contact the RTX.

In Step 3, the GMSC contacts the RTX, which checks B's subscription to this service and instructs the GMSC to connect the call to the RTX.

In Step 4, the RTX terminates the call to all of the destination numbers configured for B (B, C and D). The answered leg is preserved and the remaining unanswered legs are dropped from the call.

Note that, if B is not configured on the RTX for any other destination numbers, the RTX will leave itself out of the media path by instructing the GMSC to "Continue" in its processing of the call toward B (i.e., Step 3).

Note also that, termination to B from the RTX may trigger another query to the RTX, just as in Step 3. For the second query, the RTX instructs the GMSC to "Continue" processing the call toward B.

8.2.1 Quick Reach and Reverse Quick Reach Optimization

Both Quick Reach and Reverse Quick Reach are services that ultimately connect an originator to one and only one terminator. This presents an opportunity for bearer path optimization where the RTX 102 can exclude itself from the bearer path after the call has been answered (i.e., normal call processing in the network 100 can be used).

To take advantage of this optimization, the terminating call must traverse the MSC 104 that originated the call, which typically is the GMSC 104 through which the RTX 102 is connected. The RTX 102 would instruct the GMSC 104 to initiate a connection "cut-through" very similar to the cut-through that occurs during subsequent handoff scenarios, where IS-41 message directives indicate to an anchor MSC 104 to connect to a serving MSC 104 by dropping an intervening MSC 104 from the connection; however, in this scenario, it is the intervening RTX 102 that is dropped from the connection.

Figure 10:
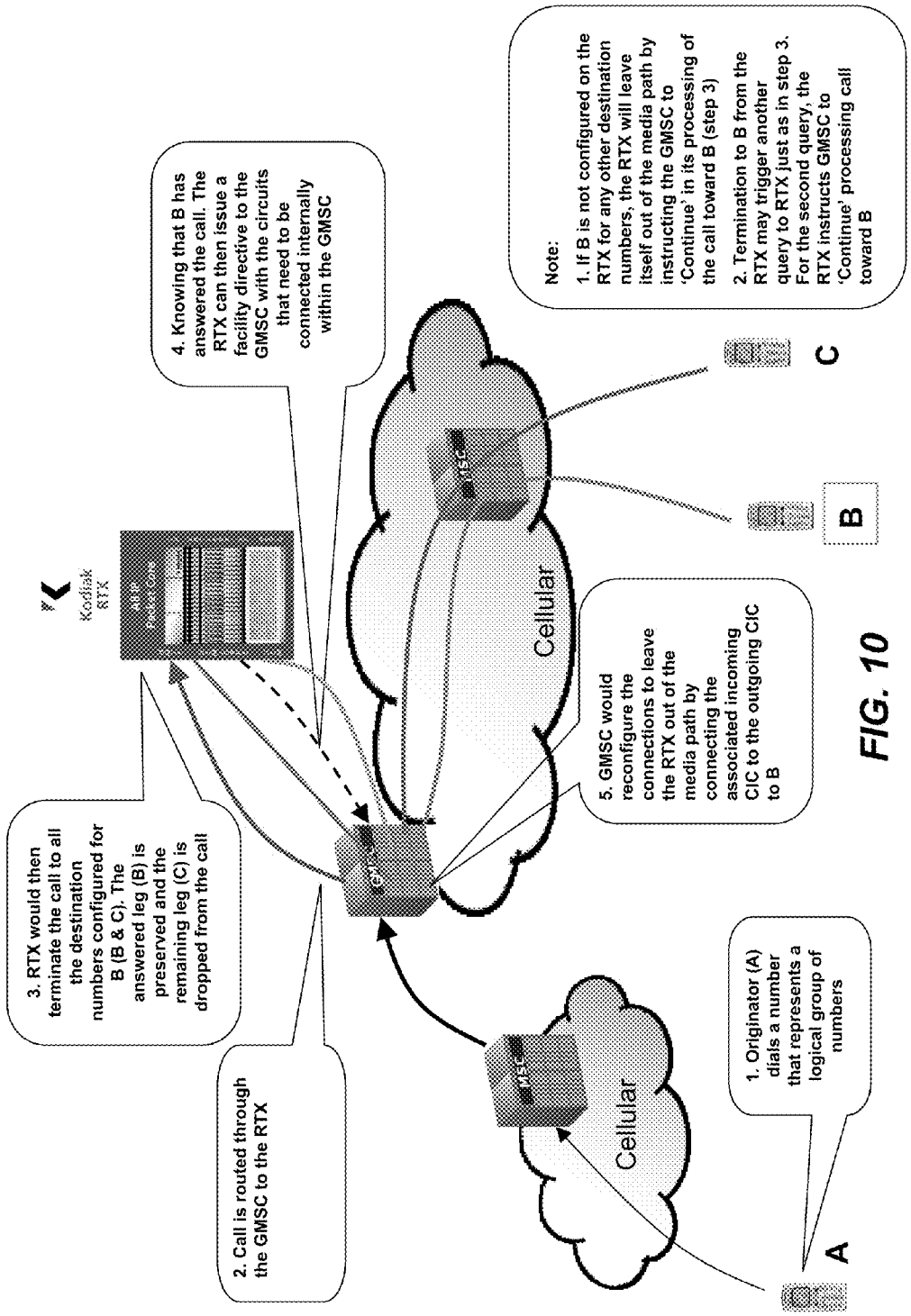
FIG. 10 illustrates a method for performing Quick Reach and Reverse Quick Reach optimization, according to a preferred embodiment of the present invention.

FIG. 10 illustrates a method for performing Quick Reach and Reverse Quick Reach optimization, according to a preferred embodiment of the present invention.

In Step 1, an originator (A) dials a number for B that represents a logical group of numbers.

In Step 2, the call is routed through the GMSC to the RTX.

In Step 3, the RTX terminates the call to all of the destination numbers configured for B (B and C). The answered leg (B) is preserved and the remaining leg (C) is dropped from the call.

In Step 4, knowing that B has answered the call, the RTX can then issue a facility directive to the GMSC that the circuits that need to be connected internally within the GMSC.

In Step 5, the GMSC reconfigures the connections to leave the RTX out of the media path by connecting the incoming bearer path or leg from A, represented by an associated incoming CIC (Circuit Identification Code), to the outgoing bearer path or leg to B, represented by an associated outgoing CIC.

Note that, if B is not configured on the RTX for more than one destination numbers, the RTX will leave itself out of the media path by instructing the GMSC to "Continue" in its processing of the call toward B (Step 3).

Note also that, termination to B from the RTX may trigger another query to RTX, just as in Step 3. For the second query, the RTX instructs the GMSC to "Continue" processing call toward B.

8.3 Single Number Based Group Calling

Each of the Enhanced Group Calling features, including Mobile Conferencing, Family Connect, Group Connect and Quick Reach, that employ a single number to represent a logical group of numbers, can be realized in an network 100 using one of the following approaches described herein.

These approaches include the deployment of a geo-redundant RTX 102 (i.e., a Geo-RTX), which is a redundant RTX 102 located at a geographically different location. Moreover, these approaches revolve around an optimal use of a block of numbers and simplifying Translation Table entries within the network 100 through a creative use of a temporary routing number.

These approaches collectively apply to a family of features known as "Connected Applications," and are defined by Connected Applications Routing.

8.3.1 Connected Applications Routing (Approach 1)

Figure 11:
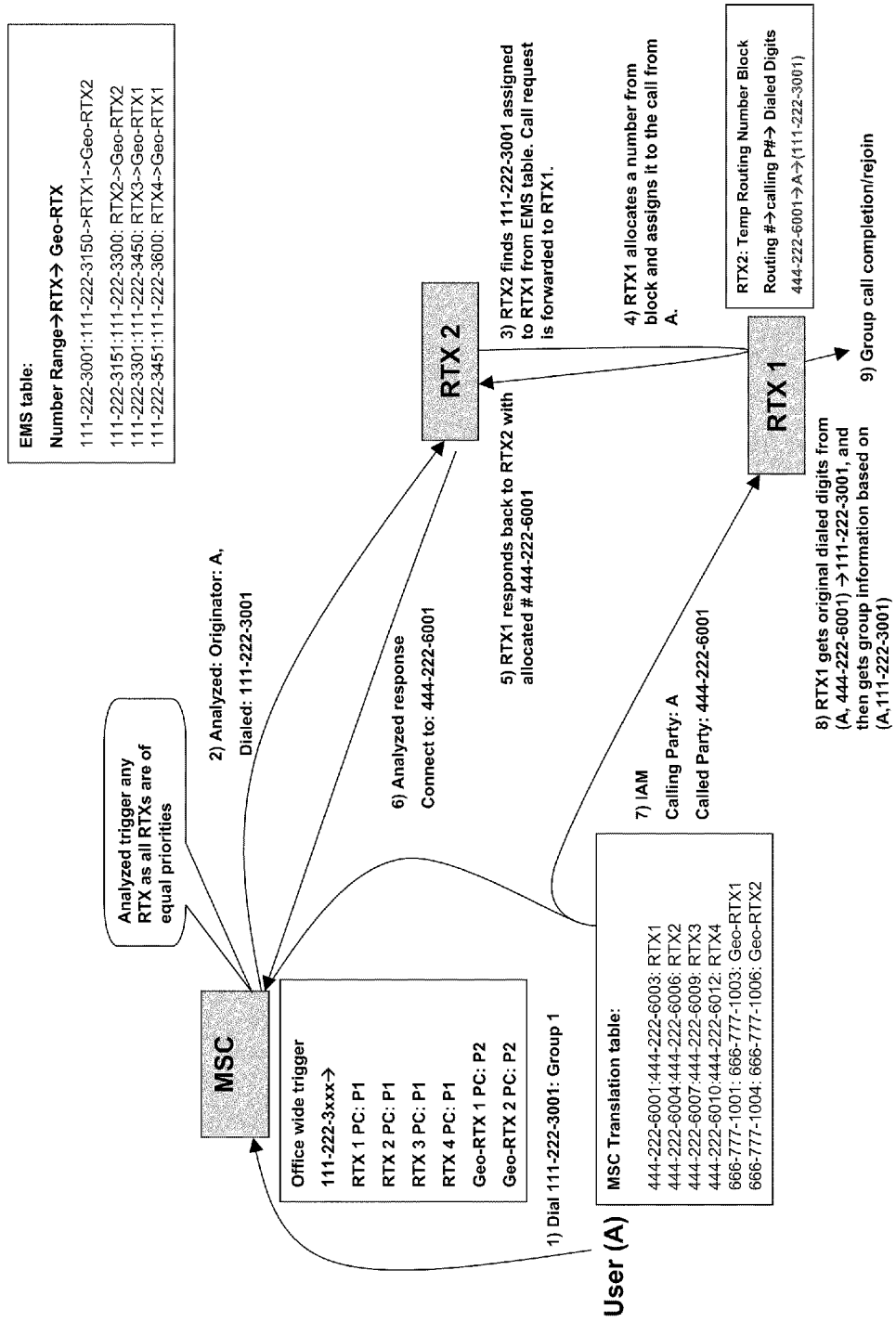
FIG. 11 illustrates a method for performing the single number based group calling in a normal scenario when the RTX is active, according to a preferred embodiment of the present invention.

FIG. 11 illustrates a method for performing the single number based group calling in a normal scenario when the RTX is active, according to a preferred embodiment of the present invention.

In Step 1, the user dials 111-222-3001 for Group 1.

In Step 2, this dialing string is analyzed by the MSC (Originator: A, Dialed: 111-222-3001), and routed to RTX2.

In Step 3, RTX2 determines from an EMS (Element Management System) Table that 111-222-3001 is assigned to RTX1. RTX2 queries RTX1 to retrieve a temporary routing number.

In Step 4, RTX1 allocates a number from a temporary routing number block and assigns it to the call from A.

In Step 5, RTX1 responds back to RTX2 with the allocated number (444-222-6001).

In Step 6, the Analyzed Response is provided to the MSC (Connect to: 444-222-6001).

In Step 7, using a Translation Table, the MSC sends an IAM (Initial Address Message) message to RTX1 (Calling Party: A, Called Party: 444-222-6001).

In Step 8, RTX1 obtains the original dialed digits ((A, 444-222-6001)→111-222-3001), and then obtains the group information based on (A, 111-222-3001).

In Step 9, the group call is completed or rejoined.

Figure 12:
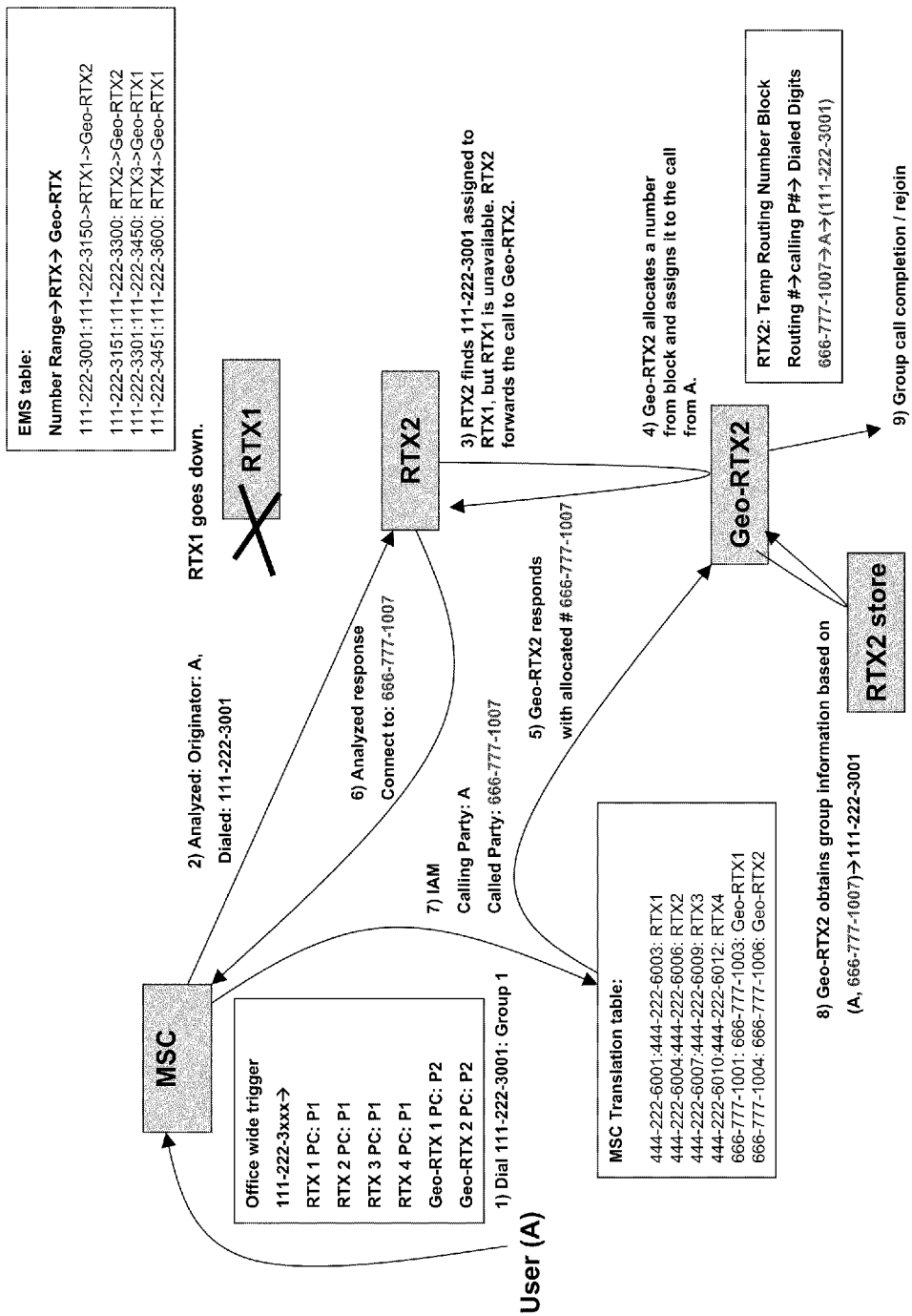
FIG. 12 illustrates a method for performing the single number based group calling in a geo-redundancy approach when the RTX is unavailable, according to a preferred embodiment of the present invention.

FIG. 12 illustrates a method for performing the single number based group calling in a geo-redundancy approach when the RTX is unavailable, according to a preferred embodiment of the present invention.

In Step 1, the user dials 111-222-3001 for Group 1.

In Step 2, this dialing string is analyzed by the MSC (Originator: A, Dialed: 111-222-3001), and routed to RTX2.

In Step 3, RTX2 determines from the EMS Table that 111-222-3001 is assigned to RTX1, but RTX1 is down (unavailable). RTX2 queries Geo-RTX2 to retrieve a temporary routing numbers.

In Step 4, Geo-RTX2 allocates a number from the temporary routing number block and assigns it to the call from A.

In Step 5, Geo-RTX2 responds back to RTX2 with the allocated number (666-777-1007).

In Step 6, the Analyzed Response is provided to the MSC (Connect to: 666-777-1007).

In Step 7, using the Translation Table, the MSC sends an IAM message to Geo-RTX2 (Calling Party: A, Called Party: 666-777-1007).

In Step 8, Geo-RTX2 obtains the group information based on ((A, 666-777-1007)→111-222-3001).

In Step 9, the group call is completed or rejoined.

Figure 13:
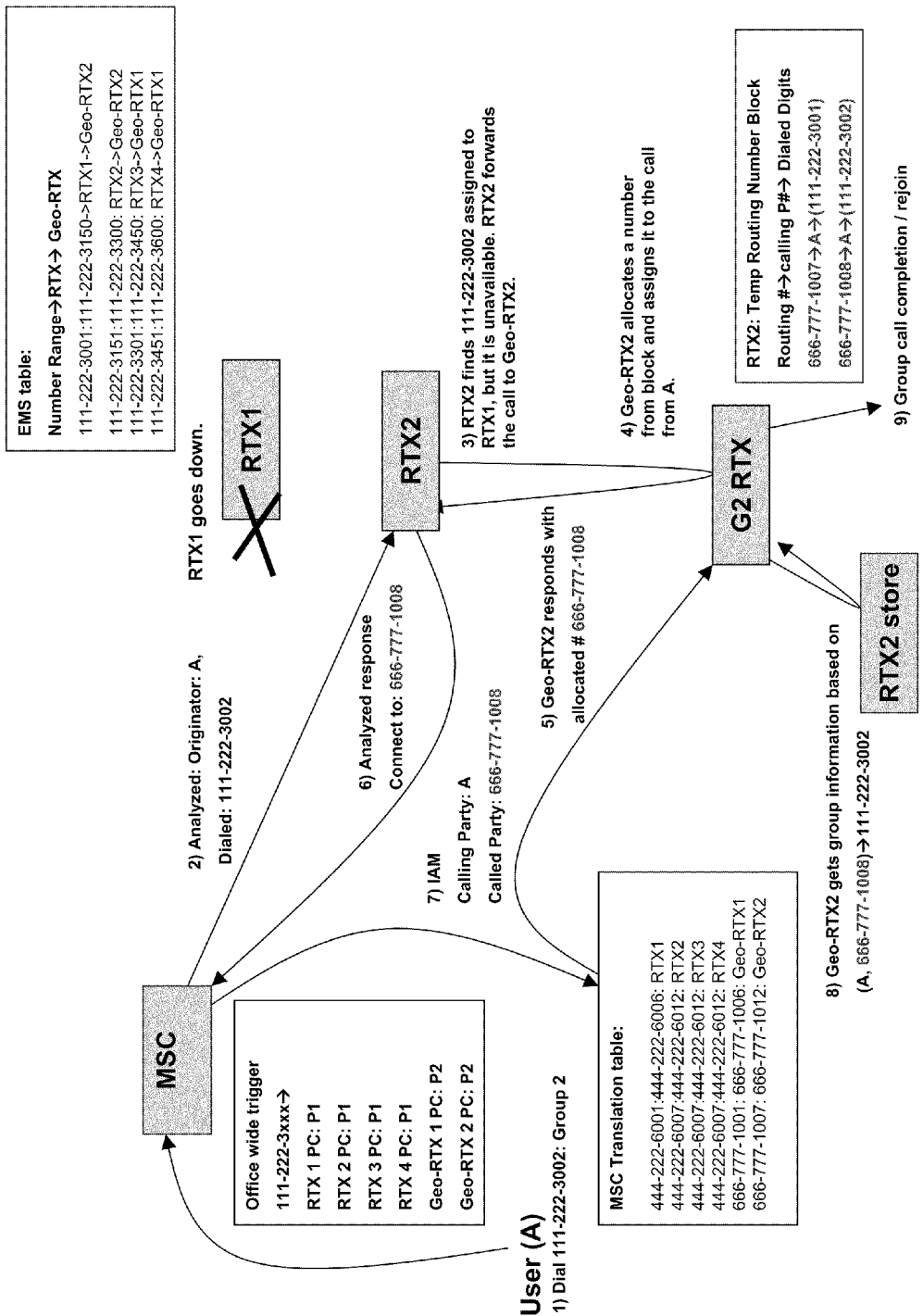
FIG. 13 illustrates a method for performing the single number based group calling in a geo-redundancy approach when the RTX is unavailable and a "race condition" exists due to a second call from the same user, according to a preferred embodiment of the present invention.
Figure 14:
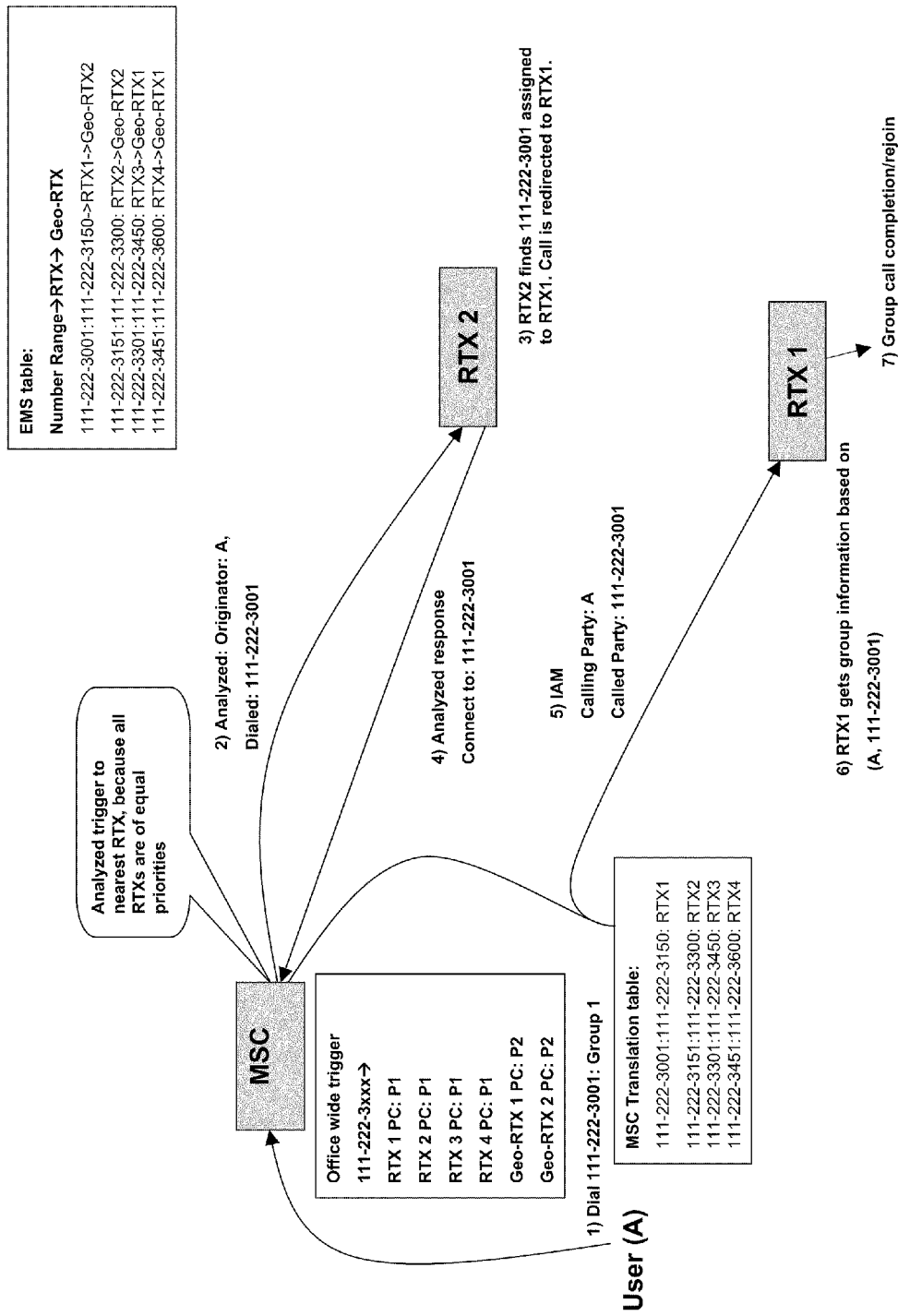
FIG. 14 illustrates a method for performing the single number based group calling in a normal scenario when the RTX is active, according to a preferred embodiment of the present invention.

FIG. 13 illustrates a method for performing the single number based group calling in a geo-redundancy approach when the RTX is unavailable and a "race condition" exists due to a second call from the same user, according to a preferred embodiment of the present invention.

In Step 1, the user dials 111-222-3002 for Group 2.

In Step 2, this dialing string is analyzed by the MSC (Originator: A, Dialed: 111-222-3002), and routed to RTX2.

In Step 3, RTX2 determines from the EMS Table that 111-222-3002 is assigned to RTX1, but RTX1 is down (unavailable), so RTX2 forwards the call to Geo-RTX2, based on the EMS Table.

In Step 4, Geo-RTX2 allocates a number from the temporary routing number block and assigns it to the call from A.

In Step 5, Geo-RTX2 responds back to RTX2 with the allocated number (666-777-1008).

In Step 6, the Analyzed Response is provided to the MSC (Connect to: 666-777-1008).

In Step 7, using the Translation Table, the MSC sends an IAM message to Geo-RTX2 (Calling Party: A, Called Party: 666-777-1008).

In Step 8, Geo-RTX2 obtains the group information based on ((A, 666-777-1008)→111-222-3002).

In Step 9, the group call is completed or rejoined.

8.3.2 Connected Applications Routing (Approach 2)

Figure 15:
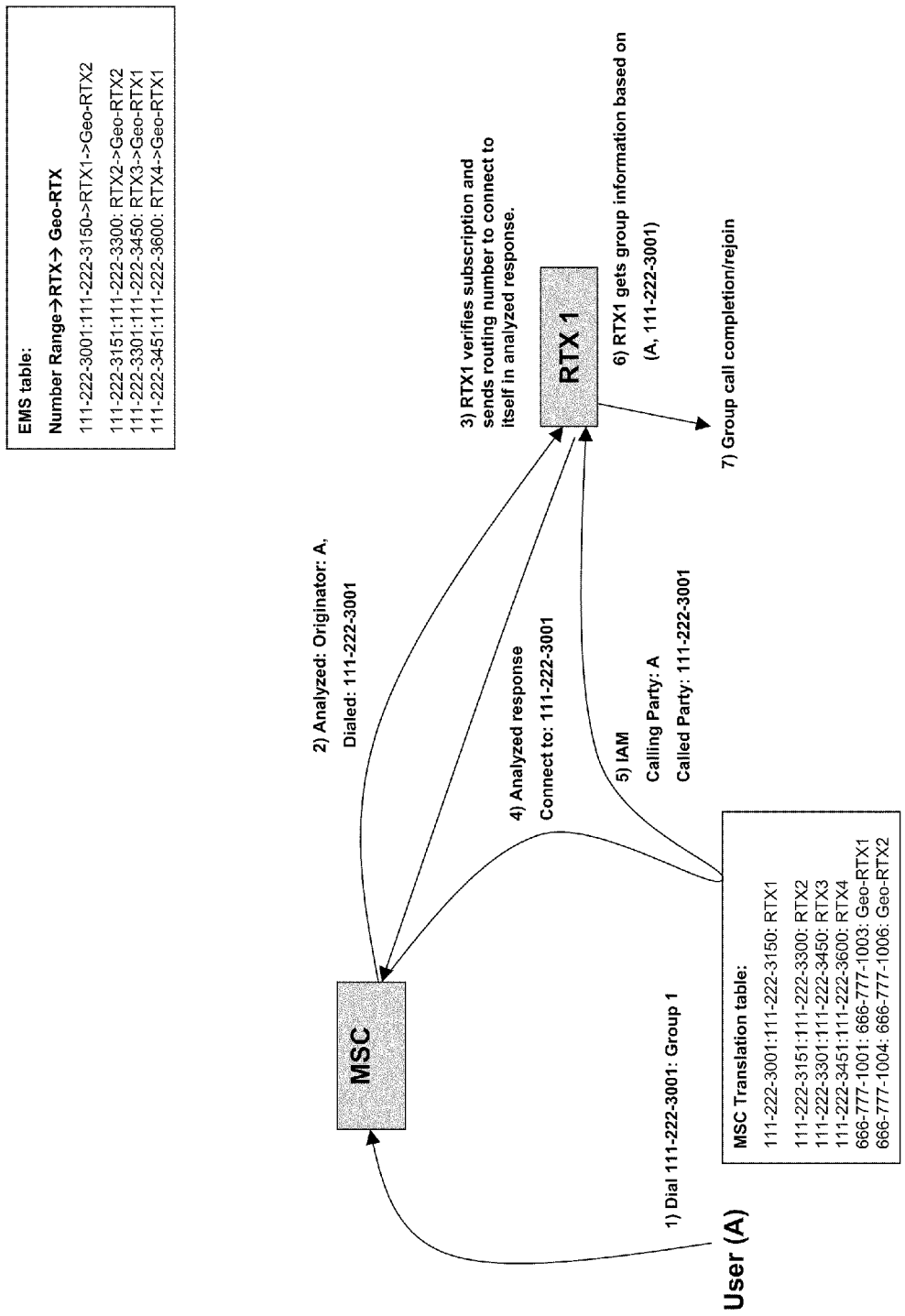
FIG. 15 illustrates a method for performing the single number based group calling in a normal scenario when the RTX is active, according to a preferred embodiment of the present invention.

FIG. 15 illustrates a method for performing the single number based group calling in a normal scenario when the RTX is active, according to a preferred embodiment of the present invention.

In Step 1, the user dials 111-222-3001 for Group 1.

In Step 2, this dialing string is analyzed by the MSC (Originator: A, Dialed: 111-222-3001), and routed to RTX1.

In Step 3, RTX1 verifies the subscription for A and generates an Analyzed Response including a routing number that connects to itself, based on the EMS table.

In Step 4, RTX1 sends the Analyzed Response to the MSC (Connect to: 111-222-3001).

In Step 5, using the Translation Table, the MSC sends an IAM message to RTX1 (Calling Party: A, Called Party: 111-222-3001).

In Step 6, RTX1 obtains the group information based on (A, 111-222-3001).

In Step 7, the group call is completed or rejoined.

Figure 16:
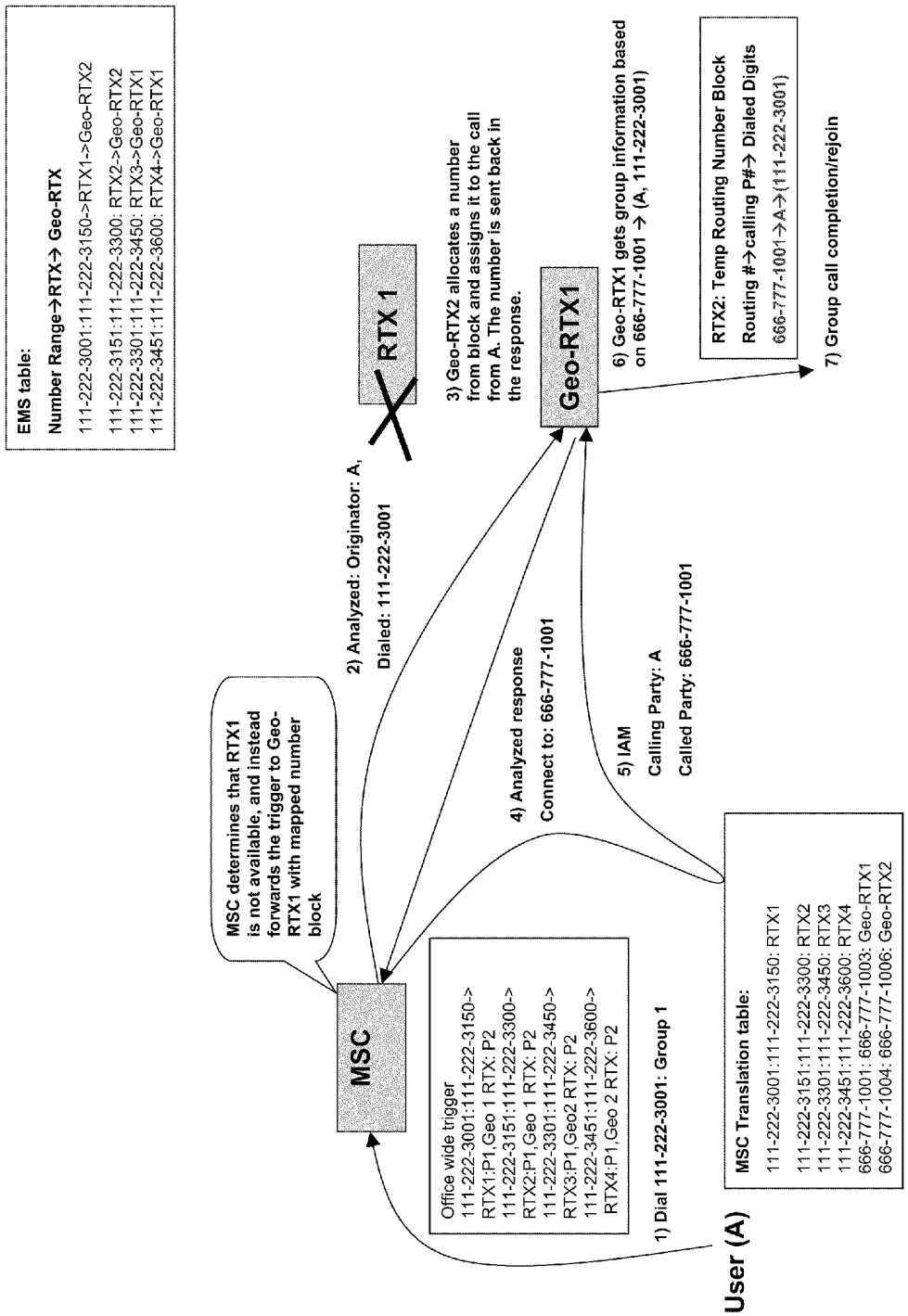
FIG. 16 illustrates a method for performing the single number based group calling in a geo-redundancy approach when the RTX is unavailable, according to a preferred embodiment of the present invention.

FIG. 16 illustrates a method for performing the single number based group calling in a geo-redundancy approach when the RTX is unavailable.

In Step 1, the user dials 111-222-3001 for Group 1.

In Step 2, this dialing string is analyzed by the MSC (Originator: A, Dialed: 111-222-3001). The MSC determines that RTX1 is unavailable, and forwards the trigger to Geo-RTX1.

In Step 3, Geo-RTX1 verifies the subscription for A and generates an Analyzed Response including a routing number from the temporary routing number block that connects to itself, based on the EMS, and assigns the routing number to the call from A.

In Step 4, Geo-RTX1 sends the Analyzed Response to the MSC (Connect to: 666-777-1001).

In Step 5, using the Translation Table, the MSC sends an IAM message to Geo-RTX1 (Calling Party: A, Called Party: 666-777-1001).

In Step 6, Geo-RTX1 obtains the group information based on (666-777-1001→(A, 111-222-3001).

In Step 7, the group call is completed or rejoined.

8.3.3 Connected Applications Routing (Approach 3)

Figure 17:
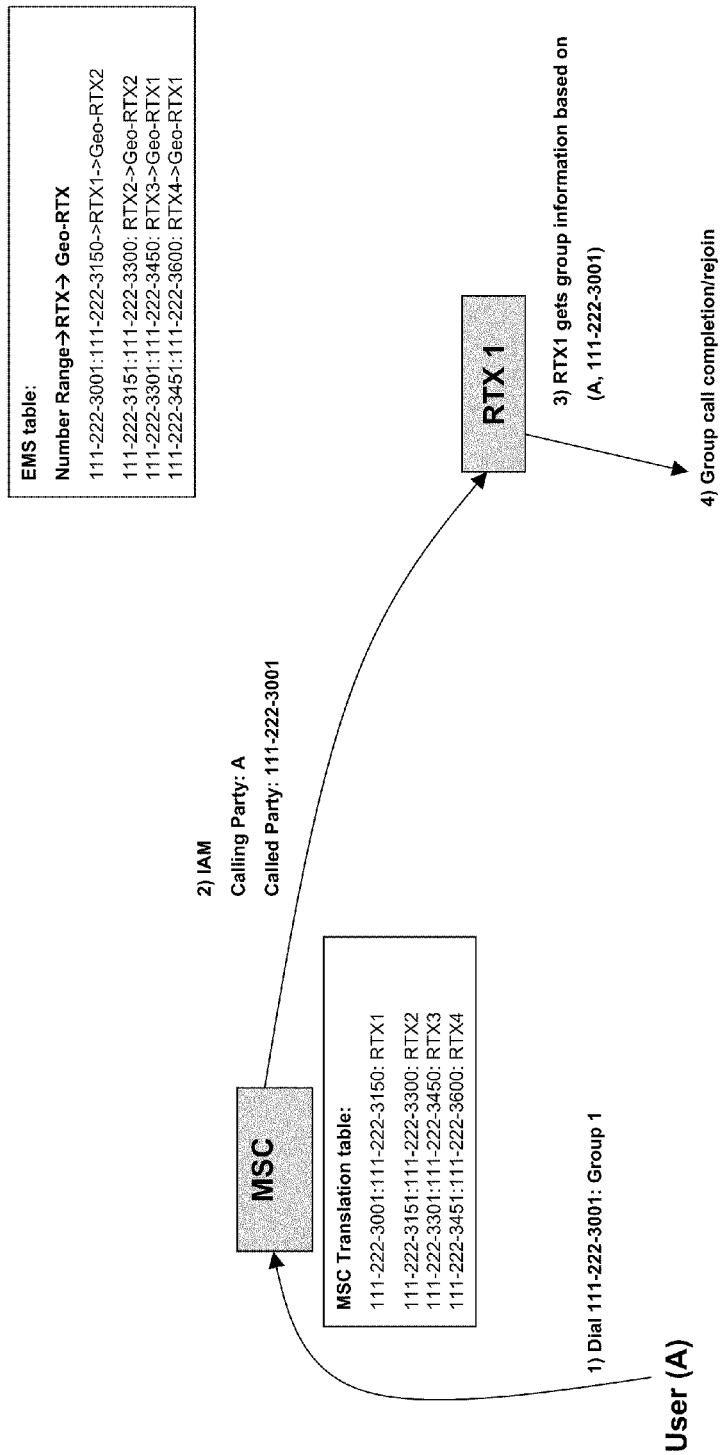
FIG. 17 illustrates a method for performing the single number based group calling in a geo-redundancy approach when the RTX is active, according to a preferred embodiment of the present invention.

FIG. 17 illustrates a method for performing the single number based group calling in a geo-redundancy approach when the RTX is active, according to a preferred embodiment of the present invention.

In Step 1, the user dials 111-222-3001 for Group 1.

In Step 2, using the Translation Table, the MSC sends an IAM message to RTX1 (Calling Party: A, Called Party: 111-222-3001).

In Step 3, RTX1 obtains the group information based on (A, 111-222-3001).

In Step 4, the group call is completed or rejoined.

Figure 18:
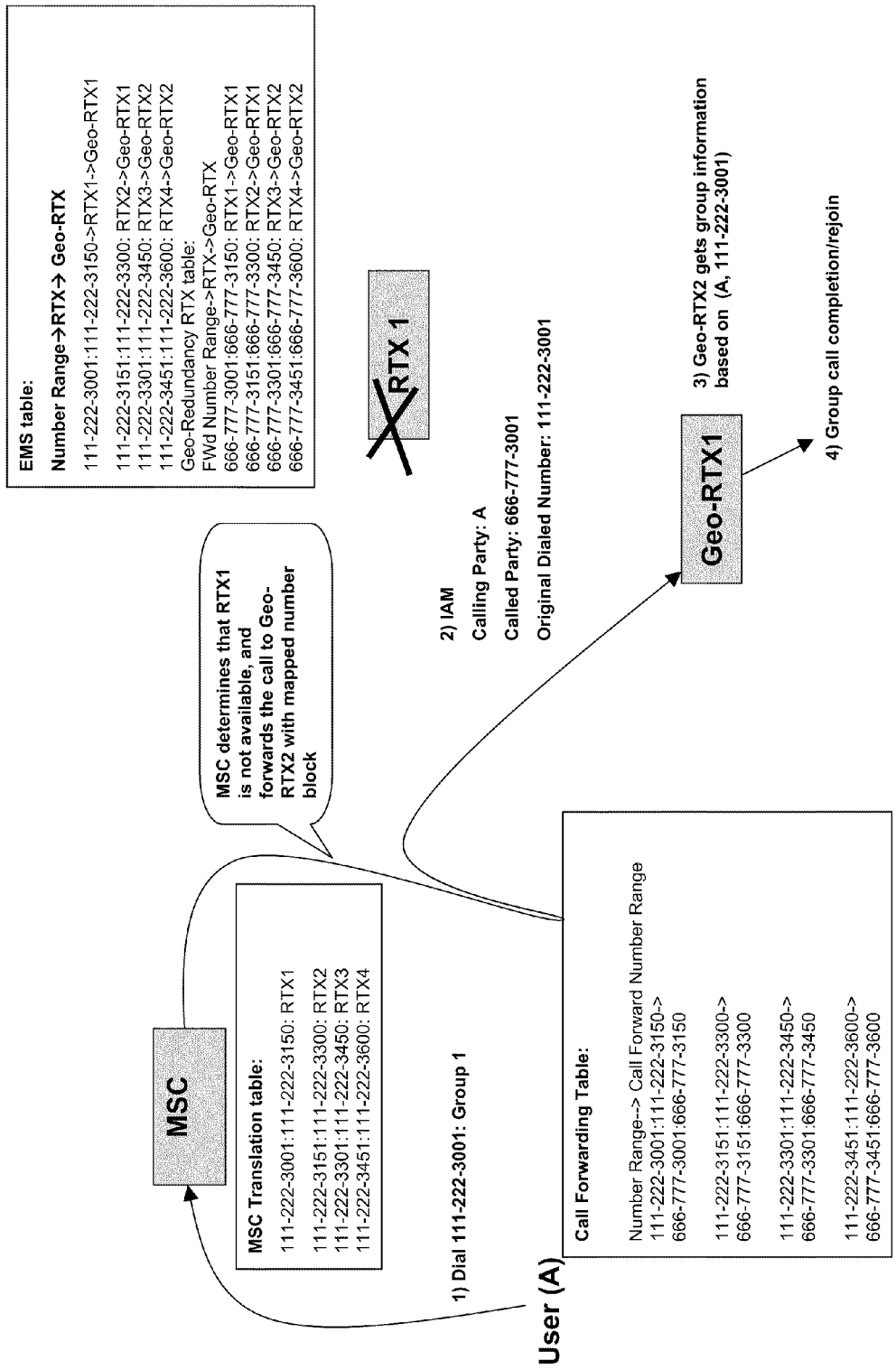
FIG. 18 illustrates a method for performing the single number based group calling in a geo-redundancy approach when the RTX is unavailable, according to a preferred embodiment of the present invention.

FIG. 18 illustrates a method for performing the single number based group calling in a geo-redundancy approach when the RTX is unavailable, according to a preferred embodiment of the present invention.

In Step 1, the user dials 111-222-3001 for Group 1.

In Step 2, this dialing string is analyzed by the MSC (Originator: A, Dialed: 111-222-3001), using the Translation Table, which identifies RTX1. However, the MSC determines that RTX1 is unavailable. Using the Call Forwarding Table, the MSC sends an IAM message to Geo-RTX1 (Calling Party: A, Called Party: 666-777-3001, Original Dialed Number: 111-222-3001).

In Step 3, Geo-RTX1 obtains the group information based on (A, 111-222-3001).

In Step 4, the group call is completed or rejoined.

15 Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing connected portfolio services in a wireless communications system, comprising:
   a wireless network for making calls between handsets, wherein the calls are initiated by call setup and in-band signaling within the wireless network and voice frames for the calls are switched between the handsets by one or more mobile switching centers across bearer paths in the wireless network; and
   a real-time exchange that interfaces to at least one of the mobile switching centers in the wireless network to provide connected portfolio services therein, without requiring any changes to the at least one of the mobile switching centers or other equipment of the wireless network to provide the connected portfolio services;
   wherein both the real-time exchange and the handsets that use the connected portfolio services communicate with each other using the call setup and in-band signaling within the wireless network, such that a user enters a dialed number for a call on an originating handset, which initiates an originating leg of the connected portfolio services, the at least one of the mobile switching centers analyzes the dialed number and routes the originating leg of the connected portfolio services from the originating handset to the real-time exchange, the real-time exchange identifies a logical group of numbers for one or more terminating handsets of the connected portfolio services from the dialed number and allocates a single number that is assigned to the call to represent the logical group of numbers for the one or more terminating handsets of the connected portfolio services, the real-time exchange initiates one or more terminating legs of the connected portfolio services to the one or more terminating handsets through the at least one of the mobile switching centers, and the real-time exchange switches the voice frames for the connected portfolio services from the originating handset to the one or more terminating handsets across the bearer paths and through the at least one of the mobile switching centers that switches the voice frames for both the calls and the connected portfolio services in the wireless network.

2. The apparatus of claim 1, wherein a call addressed to the single number is distributed to one of a plurality of real-time exchanges deployed in the network.

3. The apparatus of claim 2, wherein the single number is translated to a temporary routing number to re-direct the call to the real-time exchange designated for handling the single number or re-direct the call to a geographically redundant real-time exchange.

4. The apparatus of claim 3, wherein the temporary routing number is used by the real-time exchange to retrieve an original number and the logical group of numbers.

5. The apparatus of claim 1, further comprising a redundant real-time exchange positioned at a geographically different location that performs the same functions as the real-time exchange when the real-time exchange is unavailable.

6. A method of providing connected portfolio services in a wireless communications system, comprising:
    making calls between handsets in a wireless network, wherein the calls are initiated by call setup and in-band signaling within the wireless network and voice frames for the calls are switched between the handsets by one or more mobile switching centers across bearer paths in the wireless network; and
    interfacing a real-time exchange to at least one of the mobile switching centers in the wireless network to provide connected portfolio services therein, without requiring any changes to the at least one of the mobile switching centers or other equipment of the wireless network to provide the connected portfolio services;
    wherein both the real-time exchange and the handsets that use the connected portfolio services communicate with each other using the call setup and in-band signaling within the wireless network, such that a user enters a dialed number for a call on an originating handset, which initiates an originating leg of the connected portfolio services, the at least one of the mobile switching centers analyzes the dialed number and routes the originating leg of the connected portfolio services from the originating handset to the real-time exchange, the real-time exchange identifies a logical group of numbers for one or more terminating handsets of the connected portfolio services from the dialed number and allocates a single number that is assigned to the call to represent the logical group of numbers for the one or more terminating handsets of the connected portfolio services, the real-time exchange initiates one or more terminating legs of the connected portfolio services to the one or more terminating handsets through the at least one of the mobile switching centers, and the real-time exchange switches the voice frames for the connected portfolio services from the originating handset to the one or more terminating handsets across the bearer paths and through the at least one of the mobile switching centers that switches the voice frames for both the calls and the connected portfolio services in the wireless network.

7. The method of claim 6, wherein a call addressed to the single number is distributed to one of a plurality of real-time exchanges deployed in the network.

8. The method of claim 7, wherein the single number is translated to a temporary routing number to re-direct the call to the real-time exchange designated for handling the single number or re-direct the call to a geographically redundant real-time exchange.

9. The method of claim 8, wherein the temporary routing number is used by the real-time exchange to retrieve an original number and the logical group of numbers.

10. The method of claim 6, further comprising positioning a redundant real-time exchange at a geographically different location that performs the same functions as the real-time exchange when the real-time exchange is unavailable.

* * * * *